US010404988B2

(12) United States Patent
Ye et al.

(10) Patent No.: US 10,404,988 B2
(45) Date of Patent: Sep. 3, 2019

(54) METHOD AND APPARATUS FOR THE SIGNALING OF LOSSLESS VIDEO CODING

(71) Applicant: Vid Scale, Inc., Wilmington, DE (US)

(72) Inventors: Yan Ye, San Diego, CA (US); Xiaoyu Xiu, San Diego, CA (US); Yuwen He, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 70 days.

(21) Appl. No.: 15/127,004

(22) PCT Filed: Mar. 9, 2015

(86) PCT No.: PCT/US2015/019512
§ 371 (c)(1),
(2) Date: Sep. 16, 2016

(87) PCT Pub. No.: WO2015/142556
PCT Pub. Date: Sep. 24, 2015

(65) Prior Publication Data
US 2017/0180737 A1 Jun. 22, 2017

Related U.S. Application Data

(60) Provisional application No. 62/103,916, filed on Jan. 15, 2015, provisional application No. 61/953,922, filed on Mar. 16, 2014.

(51) Int. Cl.
*H04N 19/159* (2014.01)
*H04N 19/70* (2014.01)
(Continued)

(52) U.S. Cl.
CPC ......... *H04N 19/159* (2014.11); *H04N 19/124* (2014.11); *H04N 19/174* (2014.11); *H04N 19/70* (2014.11); *H04N 19/96* (2014.11)

(58) Field of Classification Search
None
See application file for complete search history.

(56) References Cited

U.S. PATENT DOCUMENTS 8,976,861 B2 * 3/2015 Rojals ................. H03M 7/4018
375/240.02
9,042,440 B2 * 5/2015 Rojals ................. H03M 7/4018
375/240.02
(Continued)

FOREIGN PATENT DOCUMENTS

CN 103636225 A 3/2014

OTHER PUBLICATIONS

Xiu X et al: "Rext HLS: on lossless coding", 17. JCT-VC Meeting; Mar. 27, 2014-Apr. 4, 2014; Valencia; (Joint Collaborative Team on Video Coding of ISO/IEC JTC1/SC29/WG11 and ITU-T SG. 16); URL: http: //wftp3.itu.int/av-arch/jctvc-site/,, No. JCTVC-Q0106-V3, Mar. 27, 2014 (Mar. 27, 2014), Power Point Presentation.
(Continued)

*Primary Examiner* — Reza Aghevli
(74) *Attorney, Agent, or Firm* — Invention Mine LLC

(57) ABSTRACT

Systems and methods are described for generating and decoding a video data bit stream containing a high-level signaling lossless coding syntax element indicating that lossless coding is used. The high-level signaling syntax is one of a Video Parameter Set (VPS), Sequence Parameter Set (SPS), Picture Parameter Set (PPS), or slice segment header. The lossless coding syntax element may be used as a condition for generating one or more SPS, PPS and slice segment header syntax elements related to the quantization, transform, transform skip, transform skip rotation, and in-loop filtering processes.

14 Claims, 10 Drawing Sheets

(51) Int. Cl.
*H04N 19/124* (2014.01)
*H04N 19/174* (2014.01)
*H04N 19/96* (2014.01)

(56) References Cited

U.S. PATENT DOCUMENTS

| | | | | |
|---|---|---|---|---|
| 9,167,253 B2* | 10/2015 | Rojals | ........... | H04N 19/196 |
| 9,826,238 B2 | 11/2017 | Karczewicz | | |
| 2012/0300839 A1* | 11/2012 | Sze | ........... | H04N 19/91 |
| | | | | 375/240.12 |
| 2013/0003824 A1* | 1/2013 | Guo | ........... | H04N 19/176 |
| | | | | 375/240.03 |
| 2013/0044809 A1* | 2/2013 | Chong | ........... | H04N 19/647 |
| | | | | 375/240.03 |
| 2013/0077696 A1* | 3/2013 | Zhou | ........... | H04N 19/176 |
| | | | | 375/240.24 |
| 2013/0101035 A1* | 4/2013 | Wang | ........... | H04N 19/70 |
| | | | | 375/240.12 |
| 2013/0101036 A1* | 4/2013 | Zhou | ........... | H04N 19/176 |
| | | | | 375/240.12 |
| 2013/0117343 A1* | 5/2013 | Budagavi | ........... | H04N 19/60 |
| | | | | 708/400 |
| 2013/0163664 A1* | 6/2013 | Guo | ........... | H04N 19/176 |
| | | | | 375/240.12 |
| 2013/0182769 A1* | 7/2013 | Yu | ........... | H04N 19/105 |
| | | | | 375/240.16 |
| 2013/0195199 A1* | 8/2013 | Guo | ........... | H04N 19/91 |
| | | | | 375/240.18 |
| 2013/0215970 A1* | 8/2013 | Fang | ........... | H04N 19/70 |
| | | | | 375/240.18 |
| 2013/0336395 A1* | 12/2013 | Joshi | ........... | H04N 19/176 |
| | | | | 375/240.12 |
| 2013/0336399 A1* | 12/2013 | Yu | ........... | H04N 19/70 |
| | | | | 375/240.14 |
| 2014/0016698 A1* | 1/2014 | Joshi | ........... | H04N 19/88 |
| | | | | 375/240.12 |
| 2014/0029670 A1* | 1/2014 | Kung | ........... | H04N 19/176 |
| | | | | 375/240.16 |
| 2016/0255359 A1* | 9/2016 | Yu | ........... | H04N 19/105 |
| | | | | 375/240.15 |

OTHER PUBLICATIONS

International Search Report and Written Opinion dated Sep. 18, 2015 for PCT/US2015/019512.

Xiu X et al: "Rext HLS: on lossless coding", 17. JCT-VC Meeting; Mar. 27, 2014-Apr. 4, 2014; Valencia; (Joint Collaborative Team on Video Coding of ISO/IEC JTC1/SC29/WG11 and ITU-T SG. 16); URL: http: //wftp3.itu.int/av-arch/jctvc-site/,, No. JCTVC-Q0106-V3, Mar. 27, 2014 (Mar. 27, 2014), XP030116024, the whole document.

Invitation to Pay Additional Fees and, where application, protest fees for PCT/US2015/019512 dated Jul. 13, 2015.

Patent Cooperation Treaty (PCT), International Preliminary Report on Patentability for PCT/US2015/019512 dated Sep. 20, 2016.

ITU-T Recommendation H.264 and ISO/IEC/MPEG-4 part 10, "Advanced Video Coding for Generic Audiovisual Services", Series H: Audiovisual and Multimedia Systems, Infrastructure of audiovisual services—Coding of moving video, Nov. 2007, 564 pages.

SMPTE Standard, "VC-1 Compressed Video Bitstream Format and Decoding Process," SMPTE 421M-2006, (2006), pp. 1-473.

Bross, B., et. al., "High Efficiency Video Coding (HEVC) text specification draft 10 (for FDIS and Last Call)". Joint collaborative Team on Video Coding (JCT-VC), Document No. JCTVC-L1003. Jan. 2013, 315 pages.

I.-K Kim, et. al., K. McCann, "High Efficiency Video Coding (HEVC) Test Model 10 (HM 10) Encoder Description". Joint Collaborative Team on Video Coding (JCT-VC), Document No. JCTVC- L1002. Jan. 2013, 36 pages.

Flynn, D., et. al., "High Efficiency Video Coding (HEVC) Range Extensions text specification: Draft 6". Joint Collaborative Team on Video Coding (JCT-VC), Document No. JCTVC-P1005, Jan. 2014, 361 pages.

Joshi, R., et. al., "High Efficiency Video Coding (HEVC) Screen Content Coding: Draft 2". Joint Collaborative Team on Video Coding (JCT-VC), Document No. JCTVC-S1005, Oct. 2014.

Lee, T., et. al., "AHG7: Residual Quadtree for HEVC Lossless Coding". Joint Collaborative Team on Video Coding, JCTVC-L0118, Jan. 14-23, 2013, 6 pages.

Lee, T., et. al., "AHG7: Residual Quadtree for HEVC Lossless Coding". Samsung Electronics Co., Ltd Presentation, JCTVC-L0118, Jan. 14, 2013, 8 pages.

Hsiang, S-T, et. al., "AHG9: Signaling Lossless Slices". Joint Collaborative Team on Video Coding, JCTVC-O0228, Oct. 23-Nov. 1, 2013, 2 pages.

Hsiang, S-T, et. al., "AHG9: Signaling Lossless Slices". MediaTek Presentation, 15th JCT-VC Meeting, JCTVC-O0228, Oct. 23-Nov. 1, 2013, 8 pages.

* cited by examiner

US 10,404,988 B2

METHOD AND APPARATUS FOR THE SIGNALING OF LOSSLESS VIDEO CODING

CROSS-REFERENCE TO RELATED APPLICATIONS

The present application is a 35 U.S.C. 371 of International Application of PCT PCT/US2015/019512, entitled METHOD AND APPARATUS FOR THE SIGNALING OF LOSSLESS VIDEO CODING, filed on Mar. 9, 2015, which claims benefit under 35 U.S.C. § 119(e) from, U.S. Provisional Patent Application Ser. No. 61/953,922, filed Mar. 16, 2014, and U.S. Provisional Application Ser. No. 62/103,916, filed Jan. 15, 2015. The contents of these applications are incorporated herein by reference in their entirety.

BACKGROUND

Over the past two decades, various digital video compression technologies have been developed and standardized to enable efficient digital video communication, distribution and consumption. Most of the commercially widely deployed standards are developed by ISO/IEC and ITU-T, such as H.261, MPEG-1, MPEG-2 H.263, MPEG-4 (part-2), and H.264/AVC (MPEG-4 part 10 Advance Video Coding). Due to the emergence and maturity of new advanced video compression technologies, a new video coding standard, High Efficiency Video Coding (HEVC), under joint development by ITU-T Video Coding Experts Group (VCEG) and ISO/IEC MPEG. HEVC (ITU-T H.265/ISO/IEC 23008-2) was approved as an international standard in early 2013, and is able to achieve substantially higher coding efficiency than the current state-of-the-art H.264/AVC.

Compared to traditional digital video services (such as sending TV signals over satellite, cable and terrestrial transmission channels), more and more new video applications, such as IPTV, video chat, mobile video, and streaming video, are deployed in heterogeneous environments. Such heterogeneity exists on the clients as well as in the network. On the client side, the N-screen scenario, that is, consuming video content on devices with varying screen sizes and display capabilities, including smart phone, tablet, PC and TV, already does and is expected to continue to dominate the market. On the network side, video is being transmitted across the Internet, WiFi networks, mobile (3G and 4G) networks, and/or any combination of them.

SUMMARY

Described herein are systems and methods related to high-level signaling of lossless encoding. In some embodiments, the method includes generating a video data bit stream containing a high-level syntax element indicating lossless coding is used. The high-level signaling syntax may be one of a picture parameter set (PPS), Sequence Parameter Set (SPS), Video Parameter Set (VPS), or slice segment header. The lossless coding syntax element may be used as a condition for generating one or more SPS syntax elements related to the quantization, transform, transform skip, transform skip rotation, and in-loop filtering processes.

In some embodiments, a method comprises generating a picture parameter set (PPS) including a transquant_bypass_default_flag. The transquant_bypass_default_flag is set to 1 indicating a default value of the cu_transquant_bypass_flag of all coding units in a slice that refer to the PPS. The PPS may also have the transquant_bypass_enabled_flag equal to 0.

At the decoder side, a plurality of processing blocks, including inverse quantization, inverse transform, deblocking filter, sample adaptive offset (SAO), and so on, may be bypassed when lossless coding is applied. Therefore, if the decoder receives a high-level lossless coding indication, then the decoder determines that a large group of coding units (CUs) will not need these processing blocks. Shutting down these processing blocks ahead of decoding may be advantageous in terms of power reduction, processing cycle reduction, better load provisioning, etc.

Thus in some embodiments, a method comprises, at a video decoder, receiving a high level lossless coding indication and responsively shutting down a plurality of processing blocks. The plurality of processing blocks may include one or more of any of the following hardware blocks: inverse quantization, inverse transform, deblocking filter, and/or SAO. Furthermore, the processing blocks may be shut down ahead of video decoding, causing a reduction in power consumption of at least a portion of the processing block hardware components.

BRIEF DESCRIPTION OF THE DRAWINGS

A more detailed understanding may be had from the following description, presented by way of example in conjunction with the accompanying drawings, wherein.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Video Encoding and Decoding

Figure 1A:
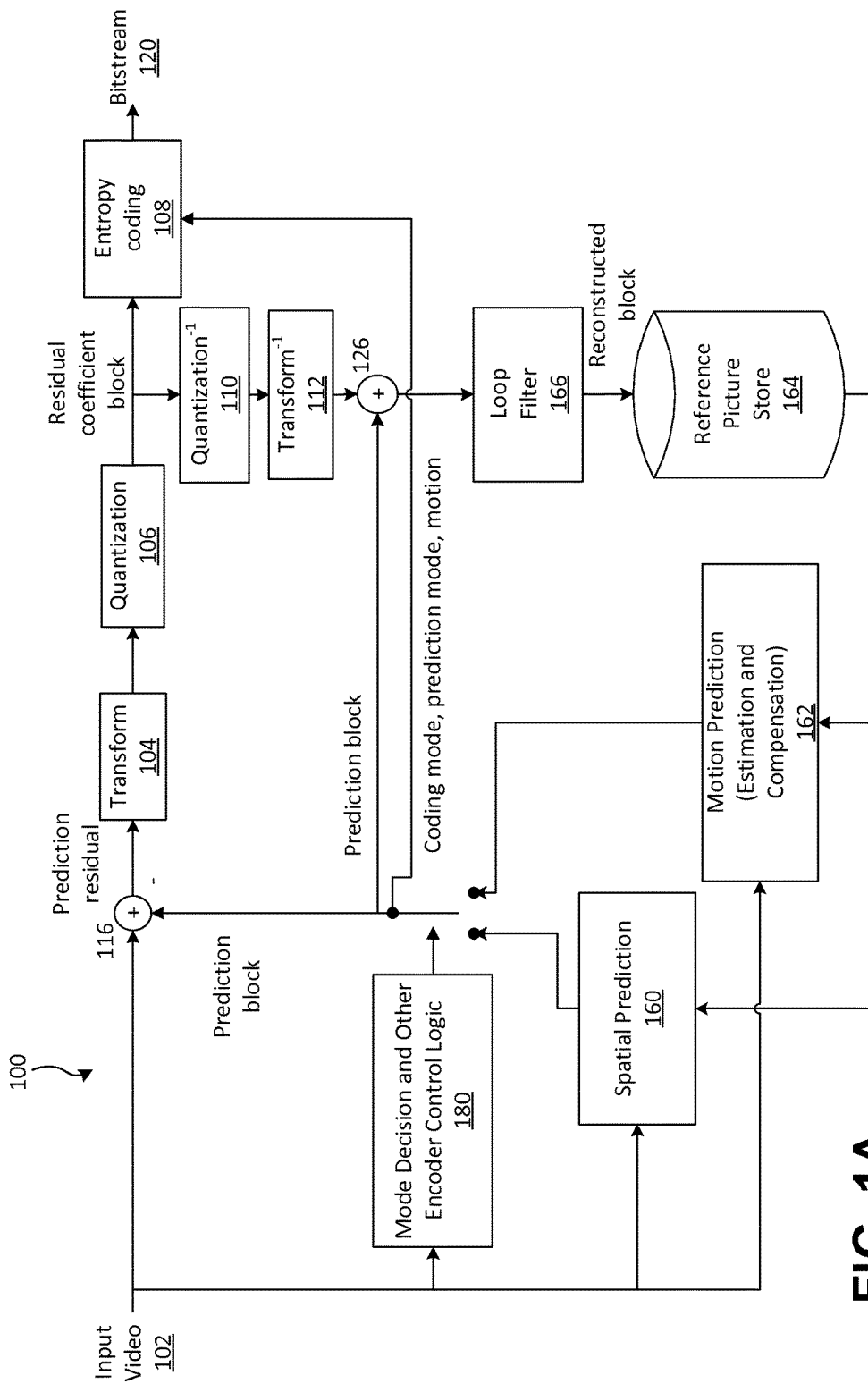
FIG. 1A is a block diagram illustrating an example of a block-based video encoder.

FIG. 1A is a block diagram illustrating an example of a block-based video encoder, for example, a hybrid video encoding system. The video encoder 100 may receive an input video signal 102. The input video signal 102 may be processed block by block. A video block may be of any size. For example, the video block unit may include 16×16 pixels. A video block unit of 16×16 pixels may be referred to as a macroblock (MB). In High Efficiency Video Coding (HEVC), extended block sizes (e.g., which may be referred to as a coding tree unit (CTU) or a coding unit (CU), two terms which are equivalent for our purposes) may be used to efficiently compress high resolution (e.g., 1080p and beyond) video signals. In HEVC, a CU may be up to 64×64 pixels. A CU may be partitioned into prediction units (PUs), for which separate prediction methods may be applied.

For an input video block (e.g., an MB or a CU), spatial prediction 160 and/or temporal prediction 162 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for a video block, its reference picture index may be sent. The reference picture index may be used to identify from which reference picture in the reference picture store 164 the temporal prediction signal comes.

The mode decision block 180 in the encoder may select a prediction mode, for example, after spatial and/or temporal prediction. The prediction block may be subtracted from the current video block at 116. The prediction residual may be transformed 104 and/or quantized 106. The quantization block 106 can effectively reduce the number of bits needed to code the prediction residual. A Quantization Parameter (QP) may be used to control the severity of quantization. As QP value increases, more severe quantization may be applied; as a result, the coded video bit rate may be reduced and at the same time the decoded video quality may become degraded. Commonly known visual artifacts due to quantization include blocking artifacts, blurring, smearing, ringing, flickering, and so on. Other processing blocks in the video coding system illustrated in FIG. 1A and FIG. 2A may also cause information loss, especially when these processing blocks apply fixed-point operations that require an upper limit on the bit depth of the intermediate data in the processing pipeline. For example, in the transform block 104, transforms in the horizontal direction may be applied first, followed by transforms in the vertical direction. Because the transform may increase data bit depth (due to multiplications), after the horizontal transform, right shifting may be applied to the output of the horizontal transform, in order to reduce the input data bit depth for the vertical transform. Though such shifting operations may help reduce implementation cost (by reducing the data bit depth), they may also cause information loss in the processing pipeline. Additionally, to enable fixed-point operations, the transforms in recent video standards such as H.264/AVC and HEVC are integer valued transforms. Some of these integer transforms may be near orthogonal but not fully orthogonal.

If the transform (and inverse transform) matrices are not fully orthogonal, they can't guarantee perfect reconstruction. In other words, even without any quantization, after non-orthogonal transform and inverse transform are applied to an input data block, the output data block (a scaling factor may be applied to the output) may not remain mathematically identical to the input data block.

The quantized residual coefficients may be inverse quantized 110 and/or inverse transformed 112 to form the reconstructed residual, which may be added back to the prediction block 126 to form the reconstructed video block.

In-loop filtering (e.g., a deblocking filter, a sample adaptive offset, an adaptive loop filter, and/or the like) may be applied 166 to the reconstructed video block before it is put in the reference picture store 164 and/or used to code future video blocks. The video encoder 100 may output an output video stream 120. To form the output video bitstream 120, a coding mode (e.g., inter prediction mode or intra prediction mode), prediction mode information, motion information, and/or quantized residual coefficients may be sent to the entropy coding unit 108 to be compressed and/or packed to form the bitstream. The reference picture store 164 may be referred to as a decoded picture buffer (DPB).

Figure 2A:
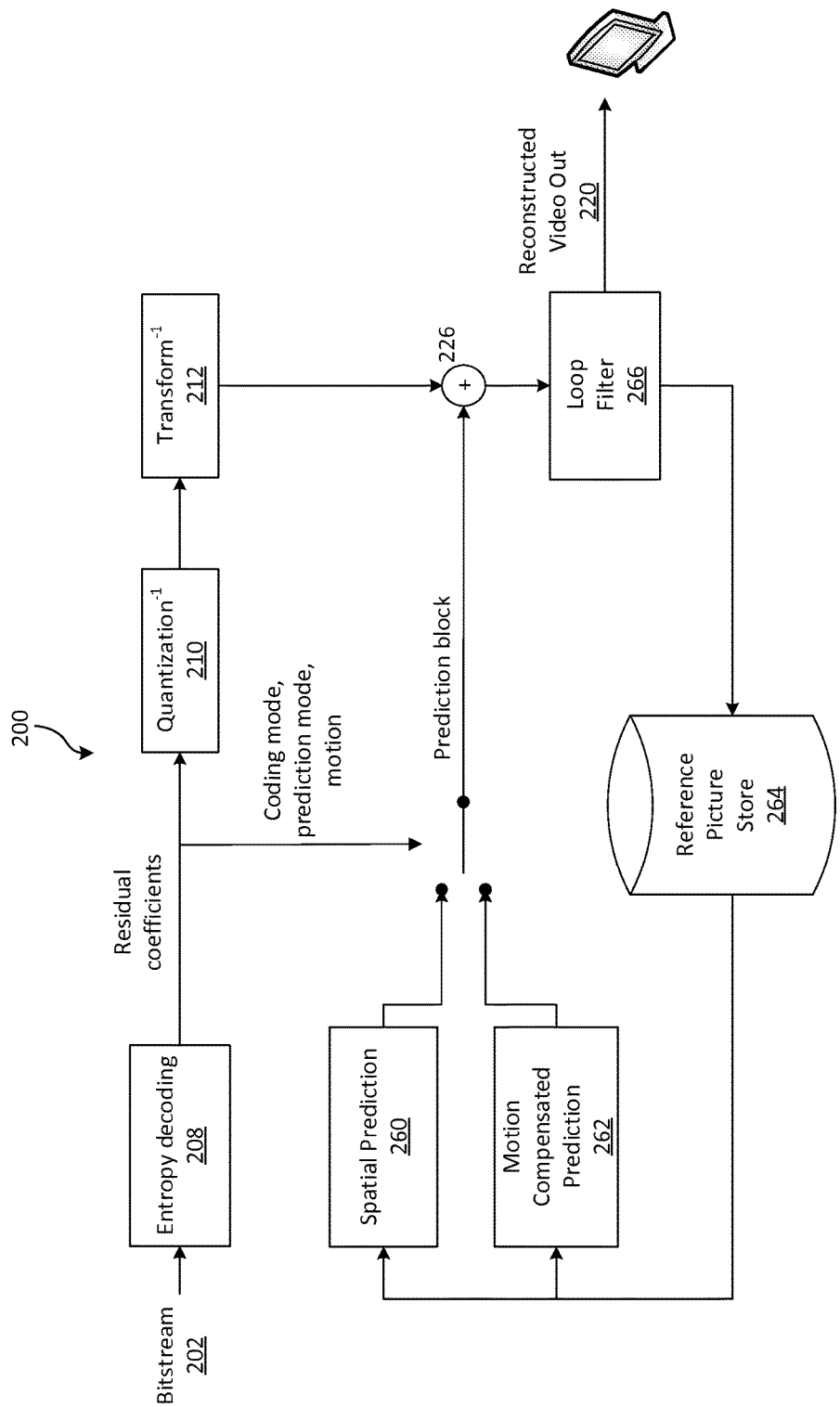
FIG. 2A is a block diagram illustrating an example of a block-based video decoder.

FIG. 2A is a block diagram illustrating an example of a block-based video decoder. The video decoder 200 may receive a video bitstream 202. The video bitstream 202 may be unpacked and/or entropy decoded at entropy decoding unit 208. The coding mode and/or prediction information used to encode the video bitstream may be sent to the spatial prediction unit 260 (e.g., if intra coded) and/or the temporal prediction unit 262 (e.g., if inter coded) to form a prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained).

Motion compensated prediction may be applied by the temporal prediction unit 262 to form the temporal prediction block. The residual transform coefficients may be sent to an inverse quantization unit 210 and an inverse transform unit 212 to reconstruct the residual block. The prediction block and the residual block may be added together at 226. The reconstructed block may go through in-loop filtering by a loop filter 266 before it is stored in reference picture store 264. The reconstructed video in the reference picture store 264 may be used to drive a display device and/or used to predict future video blocks. The video decoder 200 may output a reconstructed video signal 220. The reference picture store 264 may also be referred to as a decoded picture buffer (DPB).

A video encoder and/or decoder (e.g., video encoder 100 or video decoder 200) may perform spatial prediction (e.g., which may be referred to as intra prediction). Spatial prediction may be performed by predicting from already coded neighboring pixels following one of a plurality of prediction directions (e.g., which may be referred to as directional intra prediction).

Figure 3:
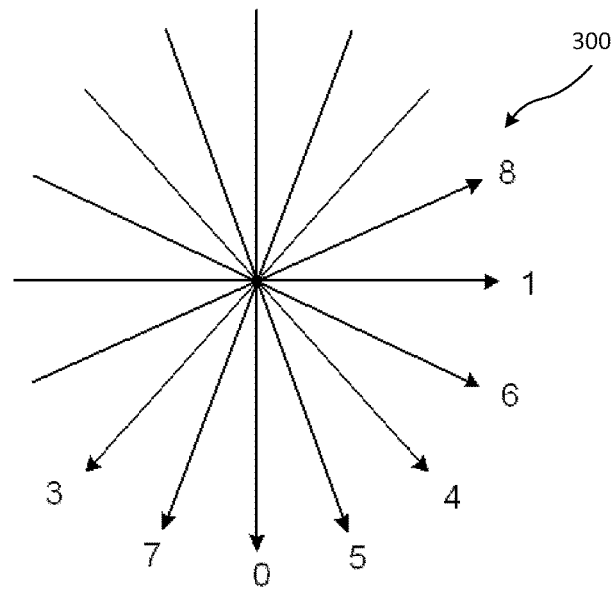
FIG. 3 is a diagram of an example of eight directional prediction modes.

FIG. 3 is a diagram of an example of eight directional prediction modes. The eight directional prediction modes of FIG. 3 may be supported in H.264/AVC. The nine modes (including DC mode 2) are:

Mode 0: Vertical Prediction
Mode 1: Horizontal prediction.
Mode 2: DC prediction.
Mode 3: Diagonal down-left prediction.
Mode 4: Diagonal down-right prediction.

Mode 5: Vertical-right prediction.
Mode 6: Horizontal-down prediction.
Mode 7: Vertical-left prediction.
Mode 8: Horizontal-up prediction.

Spatial prediction may be performed on a video block of various sizes and/or shapes. Spatial prediction of a luma component of a video signal may be performed, for example, for block sizes of 4×4, 8×8, and 16×16 pixels (e.g., in H.264/AVC). Spatial prediction of a chroma component of a video signal may be performed, for example, for block size of 8×8 (e.g., in H.264/AVC). For a luma block of size 4×4 or 8×8, a total of nine prediction modes may be supported, for example, eight directional prediction modes and the DC mode (e.g., in H.264/AVC). Four prediction modes may be supported; horizontal, vertical, DC, and planar prediction, for example, for a luma block of size 16×16.

Figure 4:
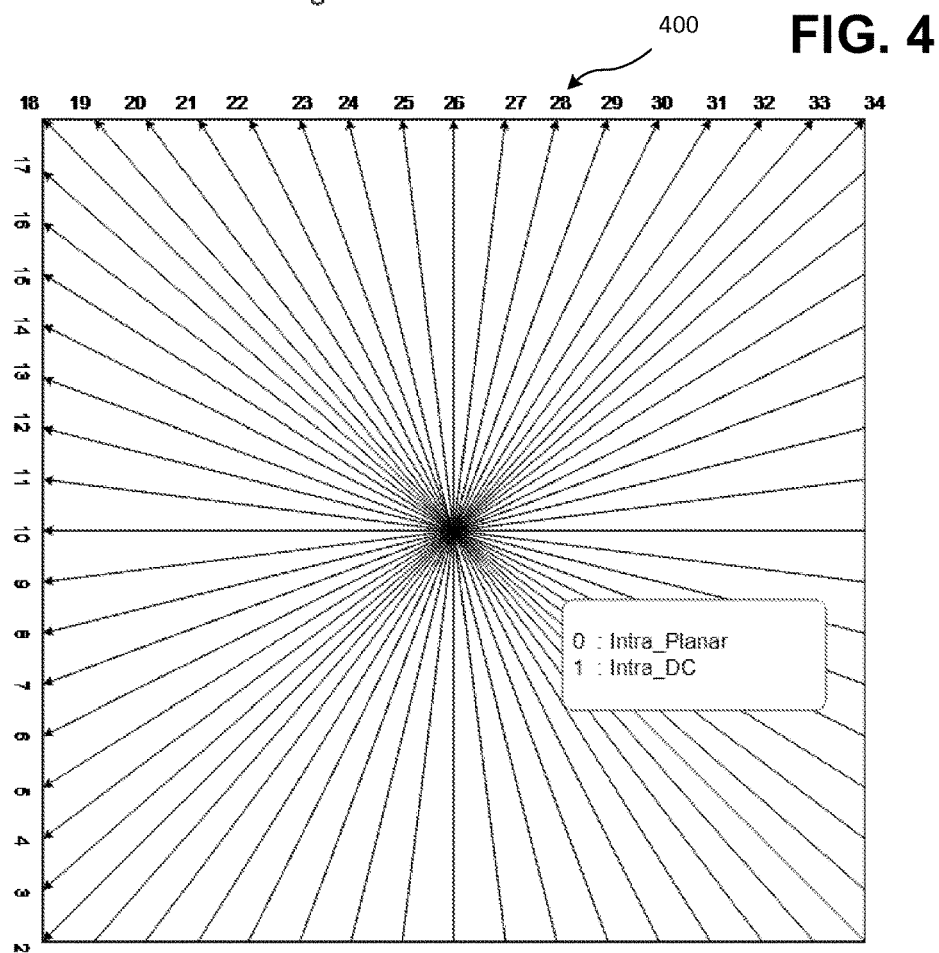
FIG. 4 is a diagram illustrating an example of 33 directional prediction modes and two non-directional prediction modes.

Directional intra prediction modes and non-directional prediction modes may be supported. FIG. 4 is a diagram illustrating an example of 33 directional prediction modes and two non-directional prediction modes. The 33 directional prediction modes and two non-directional prediction modes of FIG. 4 may be supported by HEVC. Spatial prediction using larger block sizes may be supported. For example, spatial prediction may be performed on a block of any size, for example, of square block sizes of 4×4, 8×8, 16×16, 32×32, or 64×64. Directional intra prediction (e.g., in HEVC) may be performed with 1/32-pixel precision.

Non-directional intra prediction modes may be supported (e.g., in H.264/AVC, HEVC, or the like), for example, in addition to directional intra prediction. Non-directional intra prediction modes may include the DC mode and/or the planar mode. For the DC mode, a prediction value may be obtained by averaging the available neighboring pixels and the prediction value may be applied to the entire block uniformly. For the planar mode, linear interpolation may be used to predict smooth regions with slow transitions. H.264/AVC may allow for use of the planar mode for 16×16 luma blocks and chroma blocks.

Figure 5:
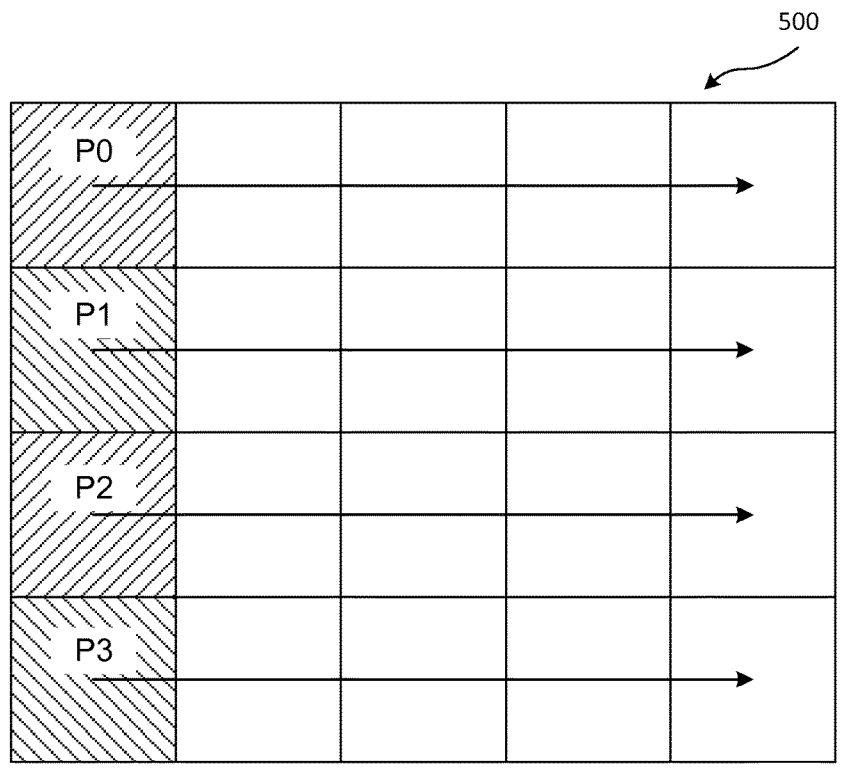
FIG. 5 is a diagram of an example of horizontal prediction.

An encoder (e.g., the encoder 100) may perform a mode decision (e.g., at block 180 in FIG. 1A) to determine the best coding mode for a video block. When the encoder determines to apply intra prediction (e.g., instead of inter prediction), the encoder may determine an optimal intra prediction mode from the set of available modes. The selected directional intra prediction mode may offer strong hints as to the direction of any texture, edge, and/or structure in the input video block. FIG. 5 is a diagram of an example of horizontal prediction (e.g., for a 4×4 block). Already reconstructed pixels P0, P1, P2 and P3 (e.g., the shaded boxes) may be used to predict the pixels in the current 4×4 video block. In horizontal prediction, a reconstructed pixel, for example, pixels P0, P1, P2 and/or P3, may be propagated horizontally along the direction of a corresponding row to predict the 4×4 block. For example, prediction may be performed according to Equation (1) below, where L(x,y) may be the pixel to be predicted at (x,y), x,y=0 . . . 3.

$$L(x,0)=P0$$

$$L(x,1)=P1$$

$$L(x,2)=P2$$

$$L(x,3)=P3 \quad (1)$$

Figure 6:
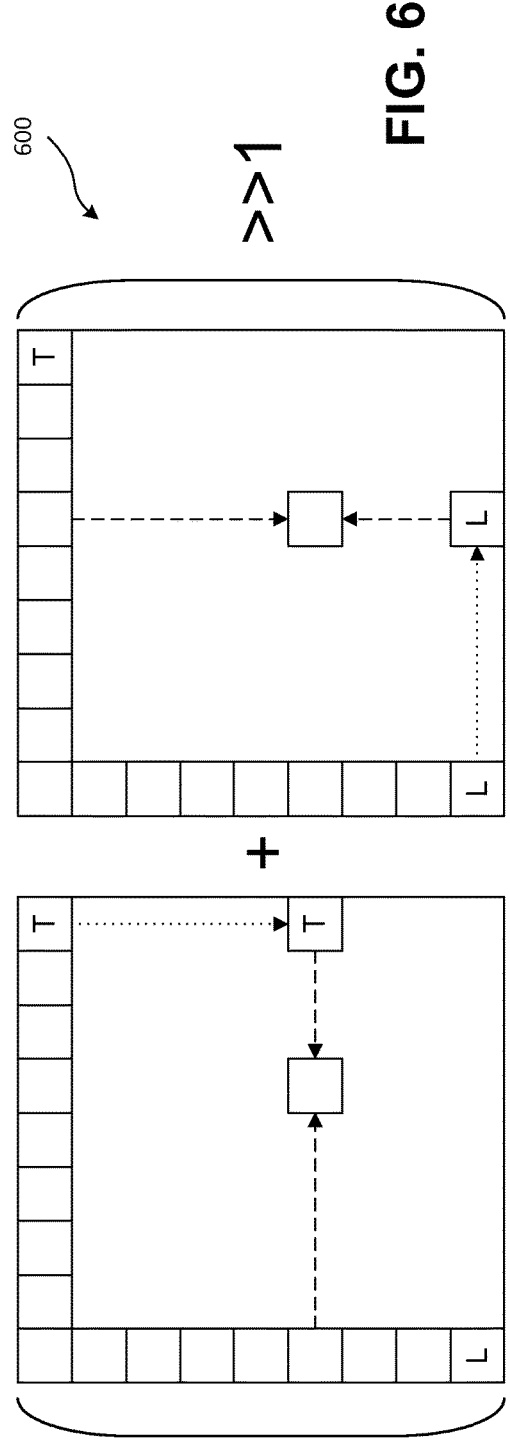
FIG. 6 is a diagram of an example of the planar mode.

FIG. 6 is a diagram of an example of the planar mode. The planar mode may be performed accordingly. The rightmost pixel in the top row (e.g., marked by a T) may be replicated to predict pixels in the rightmost column. The bottom pixel in the left column (e.g., marked by an L) may be replicated to predict pixels in the bottom row. Bilinear interpolation in the horizontal direction (e.g., as shown in the left block) may be performed to produce a first prediction H(x,y) of center pixels. Bilinear interpolation in the vertical direction (e.g., as shown in the right block) may be performed to produce a second prediction V(x,y) of center pixels. An averaging between the horizontal prediction and the vertical prediction may be performed to obtain the final prediction L(x,y), using $L(x,y)=((H(x,y)+V(x,y))>>1)$.

Figure 7:
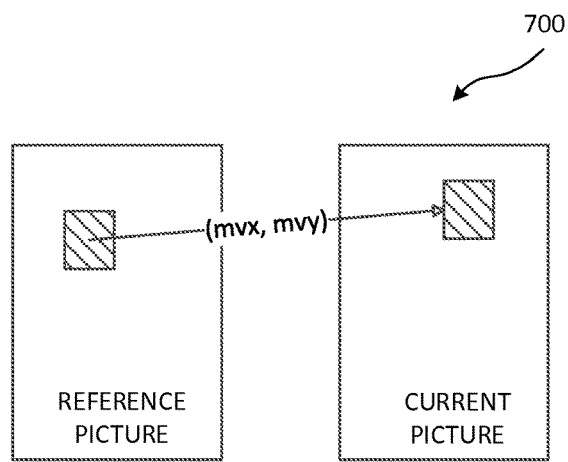
FIG. 7 is a diagram illustrating an example of motion prediction.
Figure 8:
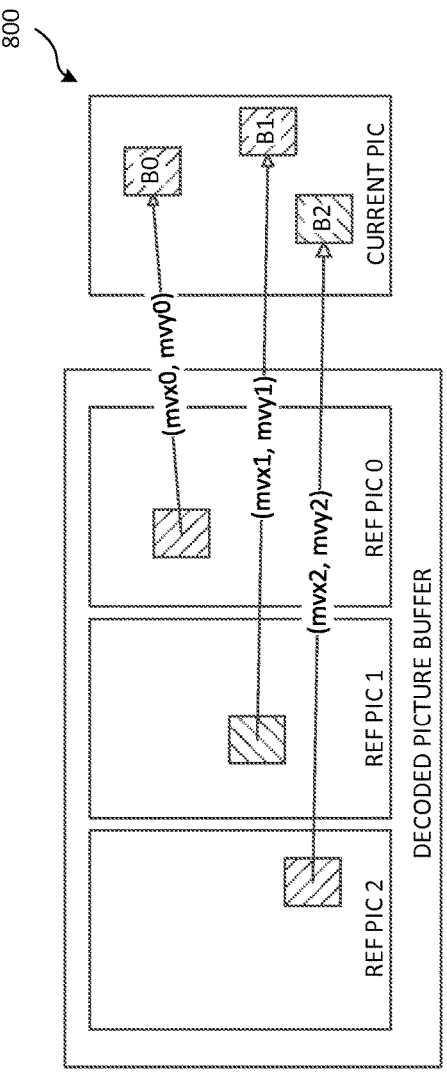
FIG. 8 is a diagram illustrating an example of block-level movement within a picture.

FIG. 7 and FIG. 8 are diagrams illustrating an example of motion prediction of video blocks (e.g., using motion prediction unit 162 of FIG. 1A). FIG. 8 is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), temporal prediction may be performed as provided by equation (1):

$$P(x,y)=\text{ref}(x-mvx, y-mvy) \quad (1)$$

where ref(x,y) may be pixel value at location (x, y) in the reference picture, and P(x,y) may be the predicted block. A video coding system may support inter-prediction with fractional pixel precision. When a motion vector (mvx, mvy) has fractional pixel value, one or more interpolation filters may be applied to obtain the pixel values at fractional pixel positions. Block based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as the following equation (2):

$$P(x, y) = \frac{P_0(x, y) + P_1(x, y)}{2} = \frac{\text{ref}_0(x - mvx_0, y - mvy_0) + \text{ref}_1(x - mvx_1, y - mvy_1)}{2} \quad (2)$$

where $P_0(x, y)$ and $P_1(x, y)$ may be the first and the second prediction block, respectively. As illustrated in equation (2), the two prediction blocks may be obtained by performing motion compensated prediction from two reference pictures $\text{ref}_0(x,y)$ and $\text{ref}_1(x,y)$, with two motion vectors ($mvx_0$, $mvy_0$) and ($mvx_1$, $mvy_1$) respectively. The prediction block P(x,y) may be subtracted from the source video block (e.g., at adder 116) to form a prediction residual block. The prediction residual block may be transformed (e.g., at transform unit 104) and/or quantized (e.g., at quantization unit 106). The quantized residual transform coefficient blocks may be sent to an entropy coding unit (e.g., entropy coding unit 108) to be entropy coded to reduce bit rate. The entropy coded residual coefficients may be packed to form part of an output video bitstream (e.g., bitstream 120).

Figure 11:
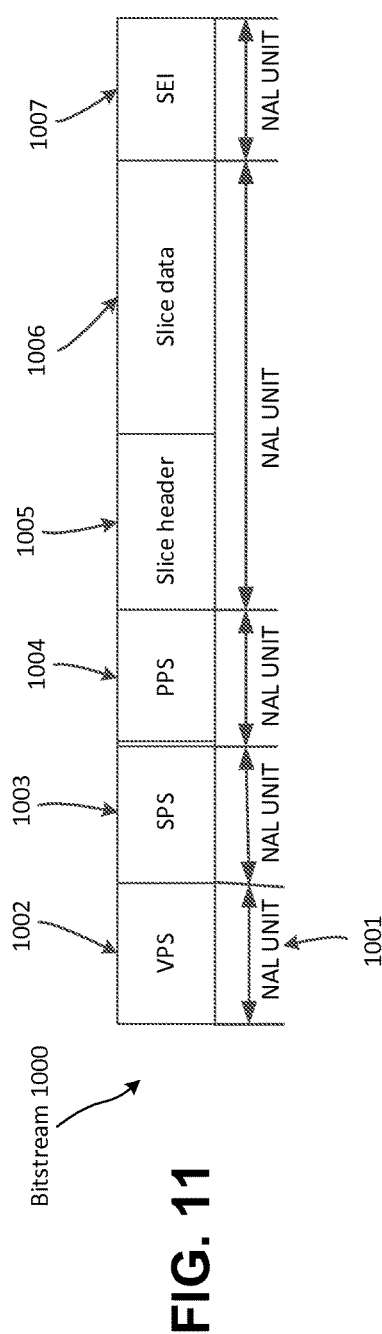
FIG. 11 is a diagram illustrating an example of a coded bitstream structure.

FIG. 11 is a diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture related information that is relatively small or relevant only for certain slice or picture types. SEI messages 1007 carry the information that may not be needed by the decoding process but can be used for various other purposes, such as picture output timing or display and/or loss detection and concealment.

Figure 9:
FIG. 9 is a diagram illustrating an example communication system.

FIG. 9 is a diagram illustrating an example of a communication system. The communication system 1300 may comprise an encoder 1302, a communication network 1304, and a decoder 1306. The encoder 1302 may be in communication with a communications network 1304 via a connection 1308. The connection 1308 may be a wireline connection or a wireless connection. The encoder 1302 may be similar to the block-based video encoder of FIG. 1A. The encoder 1302 may include a single layer codec (e.g., FIG. 1A) or a multilayer codec.

The decoder 1306 may be in communication with the communications network 1306 via a connection 1310. The connection 1310 may be a wireline connection or a wireless connection. The decoder 1306 may be similar to the block-based video decoder of FIG. 2A. The decoder 1306 may include a single layer codec (e.g., FIG. 2A) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be any suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the internet and/or one or more private commercial networks such as cellular networks, WiFi hotspots, Internet Service Provider networks (ISP's), and/or the like.

Figure 10:
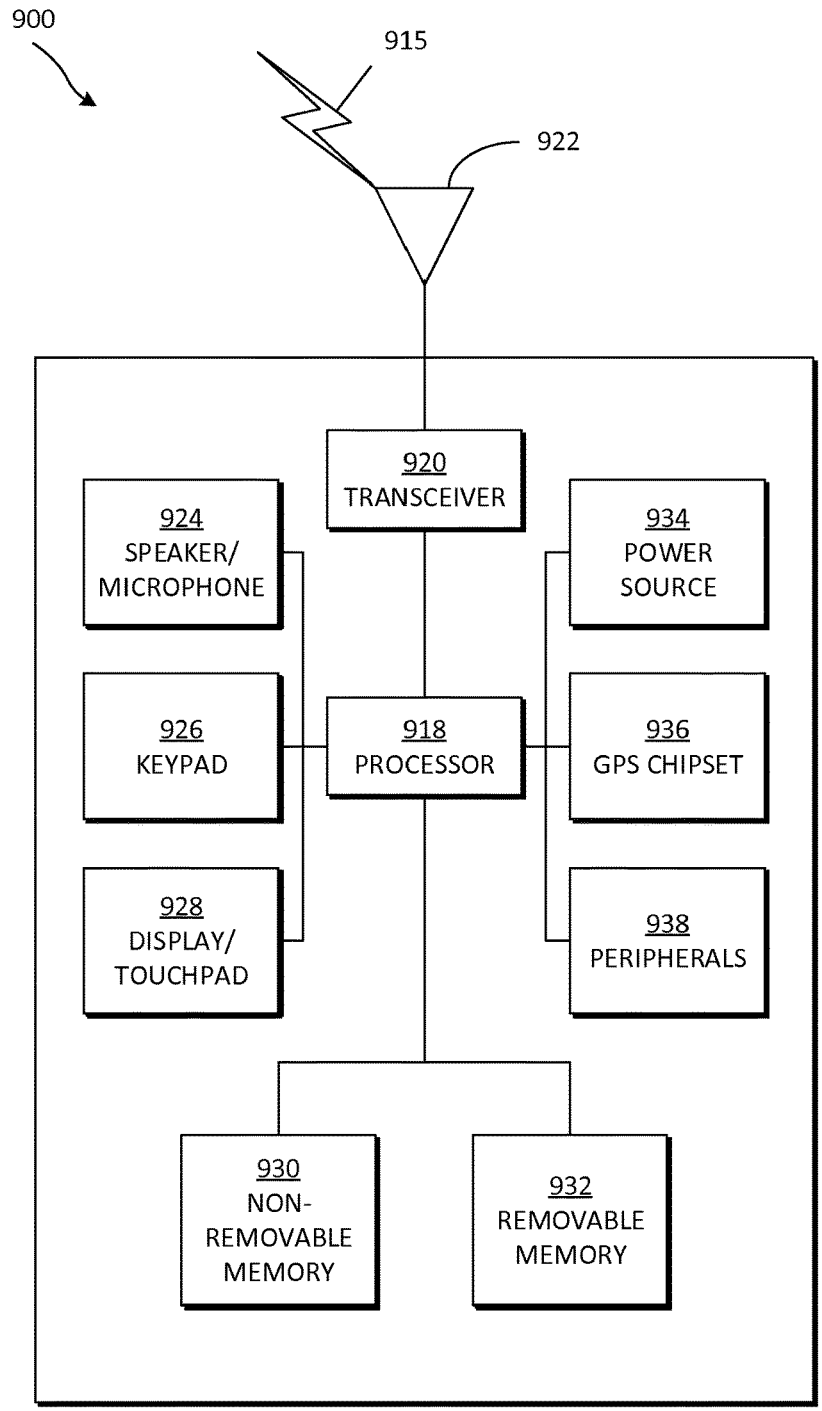
FIG. 10 is a diagram illustrating an example wireless transmit/receive unit (WTRU).

FIG. 10 is a system diagram of an example WTRU. The WTRU 902 may include a processor 918, a transceiver 920, a transmit/receive element 922, a speaker/microphone 924, a keypad or keyboard 926, a display/touchpad 928, non-removable memory 930, removable memory 932, a power source 934, a global positioning system (GPS) chipset 936, and/or other peripherals 938. It will be appreciated that the WTRU 902 may include any sub-combination of the foregoing elements while remaining consistent with an embodiment. Further, a terminal in which an encoder (e.g., encoder 802) and/or a decoder (e.g., decoder 806) may be incorporated, may include some or all of the elements depicted in and described herein with reference to the WTRU 902 of FIG. 10.

The processor 918 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wired and/or wireless environment. The processor 918 may be coupled to the transceiver 920, which may be coupled to the transmit/receive element 922. While FIG. 10 depicts the processor 918 and the transceiver 920 as separate components, it will be appreciated that the processor 918 and the transceiver 920 may be integrated together in an electronic package and/or chip.

The transmit/receive element 922 may be configured to transmit signals to, and/or receive signals from, another terminal over an air interface 915. For example, in one or more embodiments, the transmit/receive element 922 may be an antenna configured to transmit and/or receive RF signals. In one or more embodiments, the transmit/receive element 922 may be an emitter/detector configured to transmit and/or receive IR, UV, or visible light signals, for example. In one or more embodiments, the transmit/receive element 922 may be configured to transmit and/or receive both RF and light signals. It will be appreciated that the transmit/receive element 922 may be configured to transmit and/or receive any combination of wireless signals.

In addition, although the transmit/receive element 922 is depicted in FIG. 10 as a single element, the WTRU 902 may include any number of transmit/receive elements 922. More specifically, the WTRU 902 may employ MIMO technology. Thus, in some embodiments, the WTRU 902 may include two or more transmit/receive elements 922 (e.g., multiple antennas) for transmitting and receiving wireless signals over the air interface 915.

The transceiver 920 may be configured to modulate the signals that are to be transmitted by the transmit/receive element 922 and/or to demodulate the signals that are received by the transmit/receive element 922. As noted above, the WTRU 902 may have multi-mode capabilities.

Thus, the transceiver 920 may include multiple transceivers for enabling the WTRU 902 to communicate via multiple RATs, such as UTRA and IEEE 802.11, for example.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In one or more embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 915 from a terminal (e.g., a base station) and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 902 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 902 and/or a communication network (e.g., communication network 804) may implement a radio technology such as Universal Mobile Telecommunications System (UMTS) Terrestrial Radio Access (UTRA), which may establish the air interface 915 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 902 and/or a communication network (e.g., communication network 804) may implement a radio technology such as Evolved UMTS Terrestrial Radio Access (E-UTRA), which may establish the air interface 915 using Long Term Evolution (LTE) and/or LTE-Advanced (LTE-A).

The WTRU 902 and/or a communication network (e.g., communication network 804) may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 902 and/or a communication network (e.g., communication network 804) may implement a radio technology such as IEEE 802.11, IEEE 802.15, or the like.

Lossless Coding

Figure 1B:
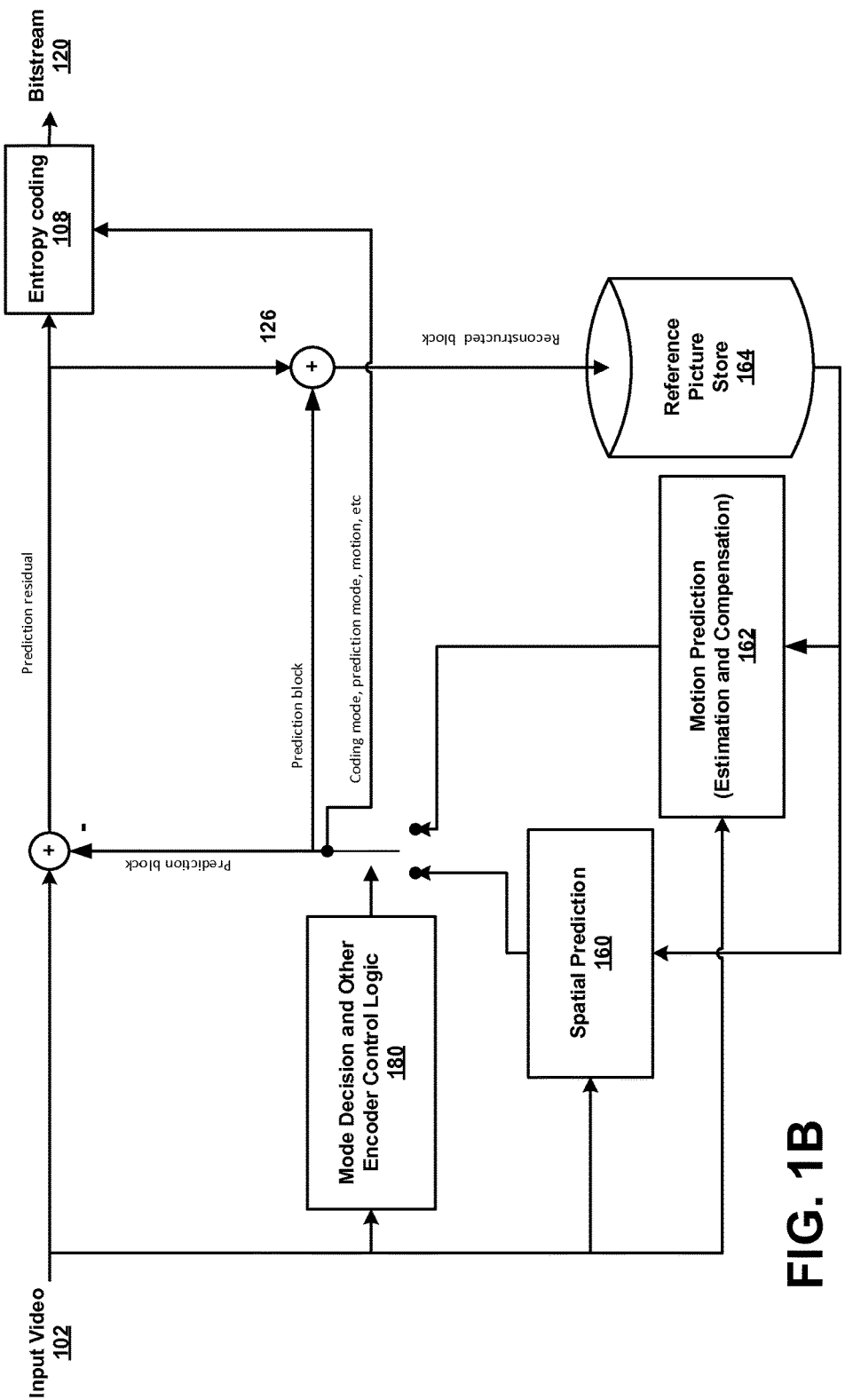
FIG. 1B is a block diagram illustrating an example of a lossless block-based video encoder.
Figure 2B:
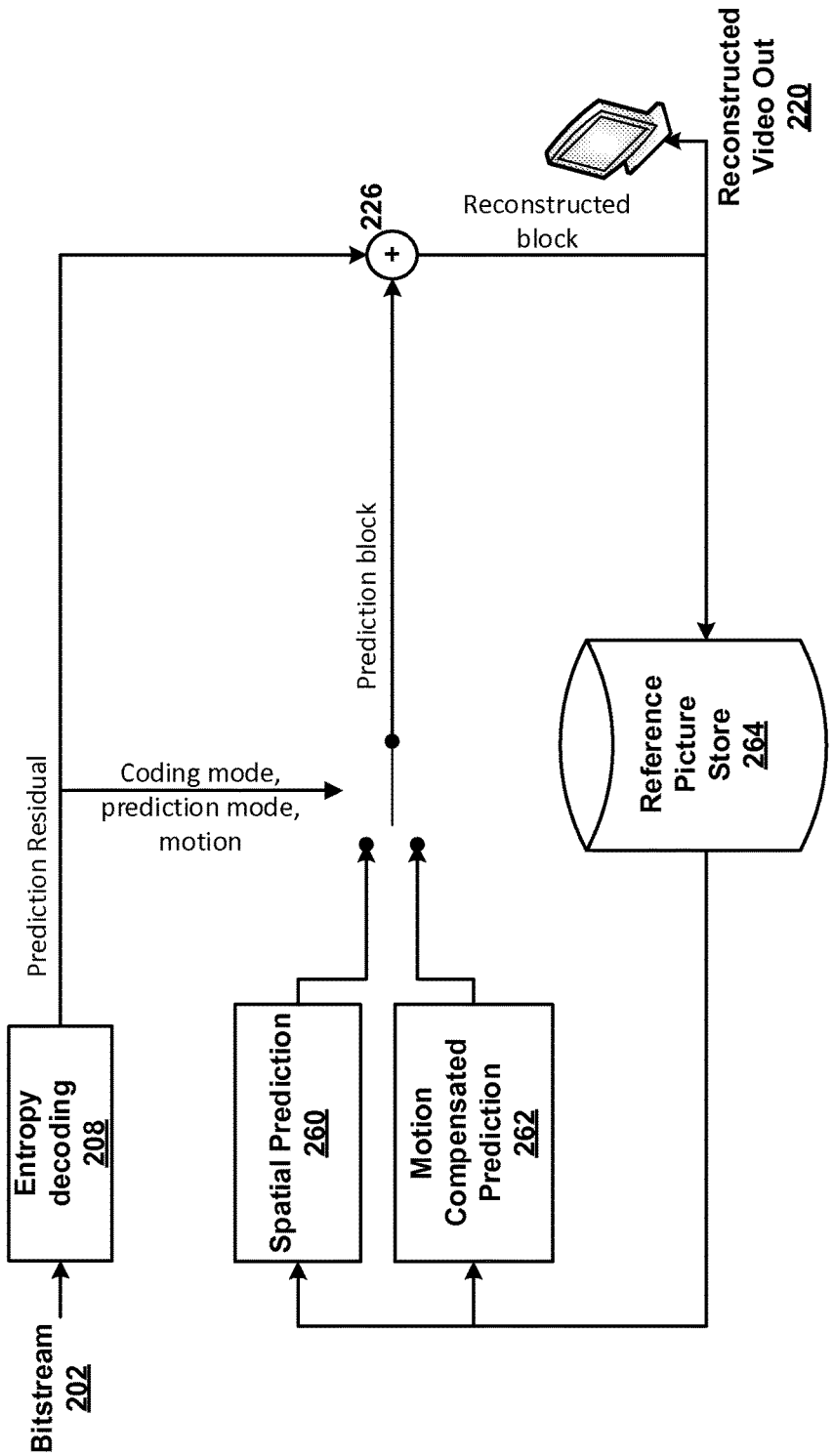
FIG. 2B is a block diagram illustrating an example of a lossless block-based video decoder.

For some video applications, such as medical video applications and high-end professional video applications, it may be desirable to preserve all the information in the original video signal without any loss. For such video applications, lossless coding can be used. In lossless coding, processing blocks in the video codec that may cause information loss, such as transform and quantization, may be modified and/or bypassed. The encoder and decoder configurations of FIGS. 1B and 2B, respectively, may be used to achieve lossless coding. In lossless coding, processing blocks for transform, quantization, inverse transform, and inverse quantization are not applied. In addition, because the reconstructed video block as the outcome of summer 126 of FIG. 1B and summer 226 of FIG. 2B is mathematically the same as the original video block, in-loop filtering may not be necessary, and indeed it may actually introduce unwanted distortion. Therefore, the processing block for in-loop filtering is also not applied in some embodiments.

Due to rapidly growing video applications such as wireless display and cloud computing, screen content coding (SCC) has received much interest from academia and industry in recent years. Although HEVC has achieved significant improvement in coding efficiency compared to the preceding video coding standards, it has been designed mainly for natural video captured by cameras. However, screen content video, which is typically composed of computer-generated content such as text and graphics, shows quite different properties from those of natural content. Given that, it would be desirable to extend HEVC for screen content coding. Intra block copy (IBC) is one coding method that has been adopted into the HEVC screen content coding extension, as described in R. Joshi, J. Xu, HEVC Screen Content Coding Draft Text 2. Document No. JCTVC-S1005, October 2014 (Joshi 2014). IBC was designed to exploit the intra-picture redundancy inherent in one picture (especially if the picture contains a substantial amount of screen content rich in text and graphics) by predicting the pixels of the current PU from the pixels of the already-reconstructed region of the same picture. Similar to inter mode, for CUs coded with IBC mode, the displacement between one predicted PU and its reference block is represented by a block vector (BV). BVs are coded together with the corresponding residuals in bit-stream.

In HEVC and its extensions, a syntax element called transquant_bypass_enabled_flag is signaled in the Picture Parameter Set (PPS) to indicate whether transform and quantization may be bypassed on a block-by-block basis. As described in D. Flynn, M. Naccari, C. Rosewarne, J. Sole, G. Sullivan, T. Suzuki, "High Efficiency Video Coding (HEVC) Range Extensions text specification: Draft 6," Document No. JCTVC-P1005, January 2014, the PPS syntax table in HEVC is shown in Table 1 below, with the transquant_bypass_enabled_flag being shown in line 22:

TABLE 1

| | PPS syntax table in HEVC range extensions draft 6. | |
|---|---|---|
| | | Descriptor |
| 1 | pic_parameter_set_rbsp( ) { | |
| 2 | pps_pic_parameter_set_id | ue(v) |
| 3 | pps_seq_parameter_set_id | ue(v) |
| 4 | dependent_slice_segments_enabled_flag | u(1) |
| 5 | output_flag_present_flag | u(1) |
| 6 | num_extra_slice_header_bits | u(3) |
| 7 | sign_data_hiding_enabled_flag | u(1) |
| 8 | cabac_init_present_flag | u(1) |
| 9 | num_ref_idx_l0_default_active_minus1 | ue(v) |
| 10 | num_ref_idx_l1_default_active_minus1 | ue(v) |
| 11* | init_qp_minus26 | se(v) |
| 12 | constrained_intra_pred_flag | u(1) |
| 13* | transform_skip_enabled_flag | u(1) |
| 14* | cu_qp_delta_enabled_flag | u(1) |
| 15 | if( cu_qp_delta_enabled_flag ) | |
| 16* |     diff_cu_qp_delta_depth | ue(v) |
| 17* | pps_cb_qp_offset | se(v) |
| 18* | pps_cr_qp_offset | se(v) |
| 19* | pps_slice_chroma_qp_offsets_present_flag | u(1) |
| 20 | weighted_pred_flag | u(1) |
| 21 | weighted_bipred_flag | u(1) |
| 22 | transquant_bypass_enabled_flag | u(1) |
| 23 | tiles_enabled_flag | u(1) |
| 24 | entropy_coding_sync_enabled_flag | u(1) |
| 25 | if( tiles_enabled_flag ) { | |
| 26 |     num_tile_columns_minus1 | ue(v) |
| 27 |     num_tile_rows_minus1 | ue(v) |
| 28 |     uniform_spacing_flag | u(1) |
| 29 |     if( !uniform_spacing_flag ) { | |
| 30 |         for( i = 0; i < num_tile_columns_minus1; i++ ) | |
| 31 |             column_width_minus1[ i ] | ue(v) |
| 32 |         for( i = 0; i < num_tile_rows_minus1; i++ ) | |
| 33 |             row_height_minus1[ i ] | ue(v) |
| 34 |     } | |
| 35* |     loop_filter_across_tiles_enabled_flag | u(1) |
| 36 | } | |
| 37* | pps_loop_filter_across_slices_enabled_flag | u(1) |
| 38* | deblocking_filter_control_present_flag | u(1) |
| 39 | if( deblocking_filter_control_present_flag ) { | |
| 40* |     deblocking_filter_override_enabled_flag | u(1) |
| 41* |     pps_deblocking_filter_disabled_flag | u(1) |
| 42 |     if( !pps_deblocking_filter_disabled_flag ) { | |
| 43* |         pps_beta_offset_div2 | se(v) |
| 44* |         pps_tc_offset_div2 | se(v) |
| 45 |     } | |
| 46 | } | |
| 47* | pps_scaling_list_data_present_flag | u(1) |
| 48 | if( pps_scaling_list_data_present_flag ) | |
| 49 |     scaling_list_data( ) | |
| 50 | lists_modification_present_flag | u(1) |
| 51 | log2_parallel_merge_level_minus2 | ue(v) |
| 52 | slice_segment_header_extension_present_flag | u(1) |
| 53 | pps_extension_present_flag | u(1) |
| 54 | if( pps_extension_present_flag ) { | |
| 55 |     for( i = 0; i < 1; i++ ) | |
| 56 |         pps_extension_flag[ i ] | u(1) |
| 57 |     pps_extension_7bits | u(7) |
| 58 | } | |
| 59 | if( pps_extension_flag[ 0 ] ) { | |
| 60 |     if( transform_skip_enabled_flag ) | |
| 61* |         log2_max_transform_skip_block_size_minus2 | ue(v) |
| 62 |     cross_component_prediction_enabled_flag | u(1) |
| 63* |     chroma_qp_adjustment_enabled_flag | u(1) |
| 64 |     if( chroma_qp_adjustment_enabled_flag ) { | |
| 65* |         diff_cu_chroma_qp_adjustment_depth | ue(v) |
| 66* |         chroma_qp_adjustment_table_size_minus1 | ue(v) |

TABLE 1-continued

PPS syntax table in HEVC range extensions draft 6.

| | | Descriptor |
|---|---|---|
| 67 | for( i = 0; i <= chroma_qp_adjustment_table_size_minus1; i++ ) { | |
| 68* | cb_qp_adjustment[ i ] | se(v) |
| 69* | cr_qp_adjustment[ i ] | se(v) |
| 70 | } | |
| 71 | } | |
| 72* | log2_sao_offset_scale_luma | ue(v) |
| 73* | log2_sao_offset_scale_chroma | ue(v) |
| 74 | } | |
| 75 | if( pps_extension_7bits ) | |
| 76 | while( more_rbsp_data( ) ) | |
| 77 | pps_extension_data_flag | u(1) |
| 78 | rbsp_trailing_bits( ) | |
| 79 | } | |

If the current slice refers to a PPS in which transquant_bypass_enabled_flag (line 22 of Table 1) is set to 1 (this is done by setting slice_pic_parameter_set_id in the slice header (line 5 in Table 2) to a proper value to identify the proper PPS), then at the Coding Unit or CU level, an additional flag called cu_transquant_bypass_flag is signaled for all the CUs in the current slice. The coding_unit syntax table is shown in Table 3.

TABLE 2

Slice segment header syntax table in HEVC range extension draft 6.

| | | Descriptor |
|---|---|---|
| 1 | slice_segment_header( ) { | |
| 2 | first_slice_segment_in_pic_flag | u(1) |
| 3 | if( nal_unit_type >= BLA_W_LP && nal_unit_type <= RSV_IRAP_VCL23 ) | |
| 4 | no_output_of_prior_pics_flag | u(1) |
| 5 | slice_pic_parameter_set_id | ue(v) |
| 6 | if( !first_slice_segment_in_pic_flag ) { | |
| 7 | if( dependent_slice_segments_enabled_flag ) | |
| 8 | dependent_slice_segment_flag | u(1) |
| 9 | slice_segment_address | u(v) |
| 10 | } | |
| 11 | if( !dependent_slice_segment_flag ) { | |
| 12 | for( i = 0; i < num_extra_slice_header_bits; i++ ) | |
| 13 | slice_reserved_flag[ i ] | u(1) |
| 14 | slice_type | ue(v) |
| 15 | if( output_flag_present_flag ) | |
| 16 | pic_output_flag | u(1) |
| 17 | if( separate_colour_plane_flag == 1 ) | |
| 18 | colour_plane_id | u(2) |
| 19 | if( nal_unit_type != IDR_W_RADL && nal_unit_type != IDR_N_LP ) { | |
| 20 | slice_pic_order_cnt_lsb | u(v) |
| 21 | short_term_ref_pic_set_sps_flag | u(1) |
| 22 | if( !short_term_ref_pic_set_sps_flag ) | |
| 23 | short_term_ref_pic_set( num_short_term_ref_pic_sets ) | |
| 24 | else if( num_short_term_ref_pic_sets > 1 ) | |
| 25 | short_term_ref_pic_set_idx | u(v) |
| 26 | if( long_term_ref_pics_present_flag ) { | |
| 27 | if( num_long_term_ref_pics_sps > 0 ) | |
| 28 | num_long_term_sps | ue(v) |
| 29 | num_long_term_pics | ue(v) |
| 30 | for( i = 0; i < num_long_term_sps + num_long_term_pics; i++ ) { | |
| 31 | if( i < num_long_term_sps ) { | |
| 32 | if( num_long_term_ref_pics_sps > 1 ) | |
| 33 | lt_idx_sps[ i ] | u(v) |
| 34 | } else { | |
| 35 | poc_lsb_lt[ i ] | u(v) |
| 36 | used_by_curr_pic_lt_flag[ i ] | u(1) |
| 37 | } | |
| 38 | delta_poc_msb_present_flag[ i ] | u(1) |
| 39 | if( delta_poc_msb_present_flag[ i ] ) | |
| 40 | delta_poc_msb_cycle_lt[ i ] | ue(v) |
| 41 | } | |
| 42 | } | |
| 43 | if( sps_temporal_mvp_enabled_flag ) | |
| 44 | slice_temporal_mvp_enabled_flag | u(1) |
| 45 | } | |
| 46 | if( sample_adaptive_offset_enabled_flag ) { | |
| 47* | slice_sao_luma_flag | u(1) |
| 48 | if( ChromaArrayType != 0 ) | |

TABLE 2-continued

Slice segment header syntax table in HEVC range extension draft 6.

|   |   | Descriptor |
|---|---|---|
| 49* | slice_sao_chroma_flag | u(1) |
| 50 | } | |
| 51 | if( slice_type = = P \|\| slice_type = = B ) { | |
| 52 | num_ref_idx_active_override_flag | u(1) |
| 53 | if( num_ref_idx_active_override_flag ) { | |
| 54 | num_ref_idx_l0_active_minus1 | ue(v) |
| 55 | if( slice_type = = B ) | |
| 56 | num_ref_idx_l1_active_minus1 | ue(v) |
| 57 | } | |
| 58 | if( lists_modification_present_flag && NumPocTotalCurr > 1 ) | |
| 59 | ref_pic_lists_modification( ) | |
| 60 | if( slice_type = = B ) | |
| 61 | mvd_l1_zero_flag | u(1) |
| 62 | if( cabac_init_present_flag ) | |
| 63 | cabac_init_flag | u(1) |
| 64 | if( slice_temporal_mvp_enabled_flag ) { | |
| 65 | if( slice_type = = B ) | |
| 66 | collocated_from_l0_flag | u(1) |
| 67 | if( ( collocated_from_l0_flag && num_ref_idx_l0_active_minus1 > 0 ) \|\| | |
|    | ( !collocated_from_l0_flag && num_ref_idx_l1_active_minus1 > 0 ) ) | |
| 68 | collocated_ref_idx | ue(v) |
| 69 | } | |
| 70 | if( ( weighted_pred_flag && slice_type = = P ) \|\| | |
|    | ( weighted_bipred_flag && slice_type = = B ) ) | |
| 71 | pred_weight_table( ) | |
| 72 | five_minus_max_num_merge_cand | ue(v) |
| 73 | } | |
| 74* | slice_qp_delta | se(v) |
| 75 | if( pps_slice_chroma_qp_offsets_present_flag ) { | |
| 76* | slice_cb_qp_offset | se(v) |
| 77* | slice_cr_qp_offset | se(v) |
| 78 | } | |
| 79 | if( chroma_qp_adjustment_enabled_flag ) | |
| 80* | slice_chroma_qp_adjustment_enabled_flag | u(1) |
| 81 | if( deblocking_filter_override_enabled_flag ) | |
| 82* | deblocking_filter_override_flag | u(1) |
| 83 | if( deblocking_filter_override_flag ) { | |
| 84* | slice_deblocking_filter_disabled_flag | u(1) |
| 85 | if( !slice_deblocking_filter_disabled_flag ) { | |
| 86* | slice_beta_offset_div2 | se(v) |
| 87* | slice_tc_offset_div2 | se(v) |
| 88 | } | |
| 89 | } | |
| 90 | if( pps_loop_filter_across_slices_enabled_flag && | |
|    | ( slice_sao_luma_flag \|\| slice_sao_chroma_flag \|\| | |
|    | !slice_deblocking_filter_disabled_flag ) ) | |
| 91* | slice_loop_filter_across_slices_enabled_flag | u(1) |
| 92 | } | |
| 93 | if( tiles_enabled_flag \|\| entropy_coding_sync_enabled_flag ) { | |
| 94 | num_entry_point_offsets | ue(v) |
| 95 | if( num_entry_point_offsets > 0 ) { | |
| 96 | offset_len_minus1 | ue(v) |
| 97 | for( i = 0; i < num_entry_point_offsets; i++ ) | |
| 98 | entry_point_offset_minus1[ i ] | u(v) |
| 99 | } | |
| 100 | } | |
| 101 | if( slice_segment_header_extension_present_flag ) { | |
| 102 | slice_segment_header_extension_length | ue(v) |
| 103 | for( i = 0; i < slice_segment_header_extension_length; i++) | |
| 104 | slice_segment_header_extension_data_byte[ i ] | u(8) |
| 105 | } | |
| 106 | byte_alignment( ) | |
| 107 | } | |

TABLE 3

Coding Unit (CU) syntax table in HEVC range extensions draft 6.

| | | Descriptor |
|---|---|---|
| 1 | coding_unit( x0, y0, log2CbSize ) { | |
| 2 | if( transquant_bypass_enabled_flag ) | |
| 3 | cu_transquant_bypass_flag | ae(v) |
| 4 | if( slice_type != I ) | |
| 5 | cu_skip_flag[ x0 ][ y0 ] | ae(v) |
| 6 | .... | |
| 7 | } | |

The value of cu_transquant_bypass_flag (line 3 of Table 3) indicates whether transform and quantization are bypassed for the current CU (if cu_transquant_bypass_flag is equal to 1) or transform and quantization are applied for the current CU (if cu_transquant_bypass_flag is equal to 0). When transquant_bypass_enabled_flag in PPS is set to 0, the additional CU level flag cu_transquant_bypass_flag is not signaled, and is inferred to be 0 (that is, transform and quantization are applied for the current CU).

When the flag cu_tranquant_bypass_flag is set to 1 for the current CU, transform and quantization are not applied to the prediction residual. Instead, the prediction residual is directly entropy coded and packed into the video bitstream, together with its prediction mode information, motion information, etc. Additionally, deblocking and Sample Adaptive Offsets (SAO) is bypassed for the current CU. This way, block-level lossless coding is achieved, that is, the reconstructed CU is mathematically the same as the original CU.

For video applications that require lossless coding, it may be desirable to apply lossless coding at the sequence level (that is, entire sequence is coded without loss) or at the picture/slice level (that is, entire picture/slice is coded without loss). The first version HEVC standard as well as the HEVC range extensions currently under development in JCT-VC, do not include or otherwise provide for high level signaling to indicate sequence/picture/slice level lossless coding. Instead, in order to achieve sequence/picture/slice level lossless coding using the existing signaling scheme, the following operations may be performed: (i) creation of a PPS in which transquant_bypass_enabled_flag is set to 1; (ii) in the slice segment headers of the video sequence/picture/slice, reference to the PPS with transquant_bypass_enabled_flag equal to 1; (iii) for all the CUs in the sequence/picture/slice, set the value of the flag cu_transquant_bypass_flag to 1.

Relying only on block-level signaling of lossless mode has a number of disadvantages. In particular, it requires sending cu_transquant_bypass_flag for all the CUs in the sequence/picture/slice, which may not be efficient. Although context-adaptive binary arithmetic coding (CABAC) is used to code this CU level flag cu_transquant_bypass_flag, which can effectively reduce the signaling overhead, this still requires the decoder to parse an additional syntax element for all CUs in the sequence/picture/slice, which may be a redundant operation.

Furthermore, if only block level signaling for a lossless mode is available, then the decoder may not be able to properly prepare for entirely lossless coding, as it remains possible that processing blocks such as inverse quantization, inverse transform, deblocking filter, SAO, and so on, may still be needed for some future CUs (that is, the value of cu_transquant_bypass_flag of some future CUs may be set to 0). This limits the available power savings that would otherwise be available from shutting down unneeded processing blocks.

Similarly, current video bitstreams contain a number of syntax elements at various levels that are not needed for lossless encoding. These elements relate to inverse quantization, inverse transform, deblocking, and SAO in high level syntax structures. For example, in PPS, some syntax elements (e.g., init_qp_minus26, cu_qp_delta_enabled_flag, pps_cb/cr_qp_offset, as shown on lines 11, 14, 17, 18, respectively, in Table 1) are related to the inverse quantization process; some syntax elements (e.g., deblocking_filter_override_enabled_flag, pps_beta_offset_div2, pps_tc_offset_div2, as shown on lines 40, 43, 44, respectively, in Table 1) are related to the deblocking process; and some syntax elements (log 2_sao_offset_scale_luma, log 2_sao_offset_scale_chroma, as shown on lines 72, 73, respectively in Table 1) are related to the SAO process. Similarly, some syntax elements in the slice segment header are related to inverse quantization (slice_qp_delta, slice_cb_qp_offset, slice_cr_qp_offset, as shown on lines 74, 76, 77, respectively, in Table 2), deblocking (slice_beta_offset_div2, slice_tc_offset_div2, as shown on lines 86, 87), and SAO (slice_sao_luma_flag, slice_sao_chroma_flag, as shown on lines 47 and 49 in Table 2). These and other syntax elements are marked with asterisks in Tables 1-3. When lossless coding is applied on the sequence/picture/slice level, it may not be necessary to signal these syntax elements, which reduces the signaling overhead. However, without a high level indication of the lossless coding mode, these high-level syntax elements must be encoded into the bitstream and transmitted to the respective decoder.

Still further, the video bitstream may contain transform-related signaling at the block level (e.g., at the CU level). For example, in the transform tree( ) syntax structure (a simplified version of transform tree( ) is shown in Table 7), flags are signaled to indicate whether quadtree splitting of transform units is performed (transform_split_flag) and/or whether there are any nonzero coefficients in the transform block for luma and chroma (cbf_luma, cbf_cb, and cbf_cr). In the lossless coding mode, the transform_ tree( ) syntax may be simplified by bypassing the signaling of these flags explicitly and instead setting these flags to appropriate default values.

Signaling Lossless Coding Mode

Described herein are various embodiments of signaling methods used in a lossless coding mode that may overcome one or more of the above disadvantages. In one such embodiment, the signaling of a lossless coding mode may be done by modifying the PPS syntax structure. Table 4 shows a modified PPS syntax table in accordance with some embodiments where an additional flag, transquant_bypass_default_flag, is added to indicate the default value of the flag cu_transquant_bypass_flag of all coding units in the slices that refer to this PPS. In this embodiment, the bit stream need not signal the flag cu_transquant_bypass_flag in each individual coding unit. By setting this new flag to 1, and setting the flag transquant_bypass_enabled_flag to 0, an encoder may indicate to the decoder that on a sequence, and/or picture, and/or slice level, lossless coding is applied. That is, without any CU level signaling, the transform, transform skip, quantization, and in-loop filtering process of all CUs that refer to this current PPS are bypassed.

The new flag transquant_bypass_default_flag may be considered to specify the default value of cu_transquant_bypass_flag when cu_transquant_bypass_flag is not present.

The existing semantics of the CU level flag cu_transquant_bypass_flag in 0 may be modified as follows: cu_transquant_bypass_flag equal to 1 specifies that the scaling and transform process as specified in subclause 8.6 and the in-loop filter process as specified in subclause 8.7 are bypassed. When cu_transquant_bypass_flag is not present, it is inferred to be equal to transquant_bypass_default_flag. As shown in Table 4, the new flag transquant_bypass_default_flag (Table 4, line 11) may be used to condition the presence of a number of syntax elements (as shown in Table 4, lines 12, 15, 17, 21, 28, 42, 45, 57, 74, and 84) in the PPS related to inverse quantization, inverse transform, and in-loop filtering process, which are marked with asterisks in Table 4. These conditions are set such that these syntax elements are only sent when transquant_bypass_default_flag is equal to 0 (that is, when lossy coding is applied). When transquant_bypass_default_flag is equal to 1 (that is, when lossless coding is applied), these syntax elements are not sent; instead, their values are inferred to be 0. For example, by inferring the value of cu_qp_delta_enabled_flag to be 0 when transquant_bypass_default_flag is set to 1, it is indicated that delta QP related syntax elements are not signaled at the CU level, thus saving bits and simplifying syntax parsing.

Further, the new flag transquant_bypass_default_flag is used to condition the presence of transform_skip_enabled_flag. The transform_skip_enabled_flag is used to bypass only the transform process (but not the quantization process). Therefore, it is a subset of transquant_bypass_enabled_flag. Further, the new flag transquant_bypass_default_ flag is used to condition the presence of transquant_bypass_enabled_flag. In this way, when transquant_bypass_default_flag is set to 1 (that is, lossless coding mode), transquant_bypass_enabled_flag is inferred to be 0, and signaling of cu_transquant_bypass_flag at the CU level is skipped.

TABLE 4

PPS syntax table with lossless coding mode signaling.

|  |  | Descriptor |
|---|---|---|
| 1 | pic_parameter_set_rbsp( ) { |  |
| 2 | pps_pic_parameter_set_id | ue(v) |
| 3 | pps_seq_parameter_set_id | ue(v) |
| 4 | dependent_slice_segments_enabled_flag | u(1) |
| 5 | output_flag_present_flag | u(1) |
| 6 | num_extra_slice_header_bits | u(3) |
| 7 | sign_data_hiding_enabled_flag | u(1) |
| 8 | cabac_init_present_flag | u(1) |
| 9 | num_ref_idx_l0_default_active_minus1 | ue(v) |
| 10 | num_ref_idx_l1_default_active_minus1 | ue(v) |
| 11† | transquant_bypass_default_flag | u(1) |
| 12† | if( !transquant_bypass_default_flag ) |  |
| 13* |     init_qp_minus26 | se(v) |
| 14 | constrained_intra_pred_flag | u(1) |
| 15† | if( !transquant_bypass_default_flag ) |  |
| 16* |     transform_skip_enabled_flag | u(1) |
| 17† | if( !transquant_bypass_default_flag ) |  |
| 18* |     cu_qp_delta_enabled_flag | u(1) |
| 19 | if( cu_qp_delta_enabled_flag ) |  |
| 20* |     diff_cu_qp_delta_depth | ue(v) |
| 21† | if( !transquant_bypass_default_flag ) { |  |
| 22* |     pps_cb_qp_offset | se(v) |
| 23* |     pps_cr_qp_offset | se(v) |
| 24* |     pps_slice_chroma_qp_offsets_present_flag | u(1) |
| 25† | } |  |
| 26 | weighted_pred_flag | u(1) |
| 27 | weighted_bipred_flag | u(1) |
| 28† | if( !transquant_bypass_default_flag ) |  |
| 29 |     transquant_bypass_enabled_flag | u(1) |
| 30 | tiles_enabled_flag | u(1) |
| 31 | entropy_coding_sync_enabled_flag | u(1) |
| 32 | if( tiles_enabled_flag ) { |  |
| 33 |     num_tile_columns_minus1 | ue(v) |
| 34 |     num_tile_rows_minus1 | ue(v) |
| 35 |     uniform_spacing_flag | u(1) |
| 36 |     if( !uniform_spacing_flag ) { |  |
| 37 |         for( i = 0; i < num_tile_columns_minus1; i++ ) |  |
| 38 |             column_width_minus1[ i ] | ue(v) |
| 39 |         for( i = 0; i < num_tile_rows_minus1; i++ ) |  |
| 40 |             row_height_minus1[ i ] | ue(v) |
| 41 |     } |  |
| 42† |     if( !transquant_bypass_default_flag ) |  |
| 43* |         loop_filter_across_tiles_enabled_flag | u(1) |
| 44 | } |  |
| 45† | if( !transquant_bypass_default_flag ) { |  |
| 46* |     pps_loop_filter_across_slices_enabled_flag | u(1) |
| 47* |     deblocking_filter_control_present_flag | u(1) |
| 48† | } |  |
| 49 | if( deblocking_filter_control_present_flag ) { |  |
| 50* |     deblocking_filter_override_enabled_flag | u(1) |
| 51* |     pps_deblocking_filter_disabled_flag | u(1) |
| 52 |     if( !pps_deblocking_filter_disabled_flag ) { |  |
| 53* |         pps_beta_offset_div2 | se(v) |

TABLE 4-continued

PPS syntax table with lossless coding mode signaling.

| | | Descriptor |
|---|---|---|
| 54* | pps_tc_offset_div2 | se(v) |
| 55 | } | |
| 56 | } | |
| 57† | if( !transquant_bypass_default_flag ) | |
| 58* | pps_scaling_list_data_present_flag | u(1) |
| 59 | if( pps_scaling_list_data_present_flag ) | |
| 60 | scaling_list_data( ) | |
| 61 | lists_modification_present_flag | u(1) |
| 62 | log2_parallel_merge_level_minus2 | ue(v) |
| 63 | slice_segment_header_extension_present_flag | u(1) |
| 64 | pps_extension_present_flag | u(1) |
| 65 | if( pps_extension_present_flag ) { | |
| 66 |   for( i = 0; i < 1; i++ ) | |
| 67 |     pps_extension_flag[ i ] | u(1) |
| 68 |   pps_extension_7bits | u(7) |
| 69 | } | |
| 70 | if( pps_extension_flag[ 0 ] ) { | |
| 71 |   if( transform_skip_enabled_flag ) | |
| 72* |     log2_max_transform_skip_block_size_minus2 | ue(v) |
| 73 |   cross_component_prediction_enabled_flag | u(1) |
| 74† |   if( !transquant_bypass_default_flag ) | |
| 75* |     chroma_qp_adjustment_enabled_flag | u(1) |
| 76 |   if( chroma_qp_adjustment_enabled_flag ) { | |
| 77* |     diff_cu_chroma_qp_adjustment_depth | ue(v) |
| 78* |     chroma_qp_adjustment_table_size_minus1 | ue(v) |
| 79 |     for( i = 0; i <= chroma_qp_adjustment_table_size_minus1; i++ ) { | |
| 80* |       cb_qp_adjustment[ i ] | se(v) |
| 81* |       cr_qp_adjustment[ i ] | se(v) |
| 82 |     } | |
| 83 |   } | |
| 84† |   if( !transquant_bypass_default_flag ) { | |
| 85* |     log2_sao_offset_scale_luma | ue(v) |
| 86* |     log2_sao_offset_scale_chroma | ue(v) |
| 87† |   } | |
| 88 | } | |
| 89 | if( pps_extension_7bits ) | |
| 90 |   while( more_rbsp_data( ) ) | |
| 91 |     pps_extension_data_flag | u(1) |
| 92 | rbsp_trailing_bits( ) | |
| 93 | } | |

In another embodiment, in order to implement the proposed additional syntax element though HEVC range extensions, the location of transquant_bypass_default_flag may be moved further down as part of the PPS extension (that is, inside the "if" condition of pps_extension_flag[0]). This arrangement may ensure that the PPS syntax of the HEVC range extensions is maximally backward compatible with the first version of the HEVC standard (B. Bross, W.-J. Han, G. J. Sullivan, J.-R. Ohm, Y. K. Wang, T. Wiegand. High Efficiency Video Coding (HEVC) text specification draft 10. Document No. JCTVC-L1003. January 2013). Table 5 shows an example of such an arrangement. In this arrangement, the new flag transquant_bypass_default_flag may be conditioned upon the value of transquant_bypass_enabled_flag. That is, transquant_bypass_default_flag is only signaled when transquant_bypass_enabled_flag is equal to 0. When transquant_bypass_enabled_flag is equal to 1, transquant_bypass_default_flag is not signaled, and the value of cu_transquant_bypass_flag in each coding unit referring to this PPS is received explicitly from the bitstream at the coding unit level. However, in the arrangement of this embodiment, because the new flag is not part of the main PPS syntax, it may not be used to condition the presence of those existing PPS syntax elements related to quantization, transform, transform skip and in-loop filtering (syntax elements marked with an asterisk) in Table 4 as described above. Another flag lossless_coding_conformance_flag is signaled if transquant_bypass_default_flag is 1. If the flag lossless_coding_conformance_flag is 1, bitstream conformance requirements may be applied to ensure that the signaled values of those syntax elements unused in lossless coding mode have proper values. For example, in a conforming bitstream, the values of syntax elements including cu_qp_delta_enabled_flag, pps_loop_filter_across_slices_enabled_flag, deblocking_filter_control_present_flag, loop_filter_across_tiles_enabled_flag, pps_scaling_list_data_present_flag, and so on, may be required to be set to 0 if the new flag transquant_bypass_default_flag is set to 1. Such bitstream conformance requirements may help minimize the signaling overhead related to syntax elements unused in lossless coding.

As described above, in some embodiments, the PPS is used to carry the new flag, transquant_bypass_default_flag, for lossless coding indication. However, in other embodiments, other high-level syntax structures, such as the Sequence Parameter Set (SPS) or Video Parameter Set (VPS), may also be used to carry the proposed flag. Alternatively, if only slice-level lossless coding indication is desired, the slice segment header may be used to carry the proposed new flag.

Note that some syntax elements related to the quantization, transform, and in-loop filtering processes may be signaled as part of the SPS. Examples of such SPS syntax elements include log 2_min_transform_block_size_minus2, log 2_diffmax_min_transform_block_size, max_transform_hierarchy_depth_inter, max_transform_hierarchy_depth_intra, scaling_list_enabled_flag, sample_adaptive_offset_enabled_flag, pcm_loop_filter_disabled_flag, transform_skip_rotation_enabled_flag, transform_skip_ context_enabled_flag, and so on. If the lossless coding mode is indicated using the flag transquant_bypass_default_ flag at the SPS level or the VPS level, then the proposed flag may be used to condition the presence of these SPS syntax elements that are related to the quantization, transform, transform skip, transform skip rotation, and in-loop filtering processes. Alternatively, similar bitstream conformance requirements may also be applied to ensure that proper values are signaled for these syntax elements, for example, to ensure that the in-loop filters are disabled if the conformance flag is set.

flag, deblocking_filter_override_flag, slice_deblocking_filter_disabled_flag, slice_beta_offset_div2, slice_tc_offset_div2 and slice_loop_filter_across_slices_enabled_flag. If slice-level lossless coding is enabled by signaling the proposed flag transquant_bypass_default_flag at the slice segment header, the proposed flag may be used to condition the presence of these syntax elements related to the quantization, transform and in-loop filtering processes in the slice segment header. Thus, in one embodiment, the flag transquant_bypass_default_flag is placed in front of those syntax elements related to quantization, transform and in-loop filtering in the slice segment header. In another embodiment, the flag transquant_bypass_default_flag may be placed at an alternative location in the slice segment header, for example, after those syntax elements related to quantization, trans-

TABLE 5

Signaling transquant_bypass_default_flag in PPS extensions.

|     |                                                                                  | Descriptor |
| --- | -------------------------------------------------------------------------------- | ---------- |
| 1   | pic_parameter_set_rbsp( ) {                                                      |            |
| 2   |    pps_pic_parameter_set_id                                       | ue(v)      |
| 3   |    pps_seq_parameter_set_id                                       | ue(v)      |
| 4   |    ...                                                            |            |
| 5   |    if( pps_extension_flag[ 0 ] ) {                                |            |
| 6†  |      if( !transquant_bypass_enabled_flag )              |            |
| 7†  |        transquant_bypass_default_flag         | u(1)       |
| 8†  |      if ( transquant_bypass_default_flag )              |            |
| 9†  |        lossless_coding_conformance_flag       | u(1)       |
| 10† |      if( transform_skip_enabled_flag && !transquant_bypass_default_flag) |  |
| 11* |        log2_max_transform_skip_block_size_minus2 | ue(v)   |
| 12  |      cross_component_prediction_enabled_flag            | u(1)       |
| 13† |      if( !transquant_bypass_default_flag )              |            |
| 14* |        chroma_qp_adjustment_enabled_flag      | u(1)       |
| 15  |      if( chroma_qp_adjustment_enabled_flag ) {          |            |
| 16* |        diff_cu_chroma_qp_adjustment_depth     | ue(v)      |
| 17* |        chroma_qp_adjustment_table_size_minus1 | ue(v)      |
| 18  |        for( i = 0; i <= chroma_qp_adjustment_table_size_minus1; i++ ) { | |
| 19* |           cb_qp_adjustment[ i ] | se(v)     |
| 20* |           cr_qp_adjustment[ i ] | se(v)     |
| 21  |        }                                      |            |
| 22  |      }                                                  |            |
| 23† |      if( !transquant_bypass_default_flag ) {            |            |
| 24* |        log2_sao_offset_scale_luma             | ue(v)      |
| 25* |        log2_sao_offset_scale_chroma           | ue(v)      |
| 26† |      }                                                  |            |
| 27  |    }                                                              |            |
| 28  |    ...                                                            |            |
| 29  | }                                                                                |            |

Slice Header Signaling

In a further embodiment, slice header signaling may be used. Similar to the PPS, the slice segment header in Table 2 also contains a number of syntax elements (those marked with asterisks) that are used for the transform, quantization, and in-loop filtering processing blocks. These syntax elements may be conditioned upon the value of the new flag transquant_bypass_default_flag, and may not need to be signaled when lossless coding is indicated by setting transquant_bypass_default_flag to 1. Table 6 shows such an example.

As shown in Table 2, a slice segment header contains several syntax elements that are related to the quantization, transform and in-loop filtering processes. Such slice segment header syntax elements (whose line numbers are marked with asterisks) include slice_sao_luma_flag, slice_sao_chroma_flag, slice_qp_delta, slice_cb_qp_offset, slice_cr_qp_offset, slice_chroma_qp_adjustment_enabled_ form and in-loop filtering. In this case, a bitstream conformance requirement should be applied to ensure that the values of those syntax elements are properly set if transquant_bypass_default_flag is set to 1. Setting transquant_bypass_default_flag to 1 indicates that all the coding units in the current slice are coded in lossless mode, without signaling the cu_transquant_bypass_flag of each individual coding unit in the bit-stream. Additionally, the following bit-stream conformance requirement can be applied: that the value of the flag transquant_bypass_enabled_flag of the PPS that the current slice refers to is equal to 1 when the proposed flag transquant_bypass_default_flag is set to 1.

Table 6 shows one example of the modified slice segment header when the proposed flag transquant_bypass_default_flag is signaled before the syntax elements related to quantization, transform and in-loop filtering in the slice segment header. Note that although the example in Table 6 shows that the proposed transquant_bypass_default_flag is signaled in the slice segment header, this flag may be instead signaled in the PPS (Table 5) and be used to condition the presence of the slice segment header syntax elements indicated with asterisks.

TABLE 6

Modified slice segment header syntax using transquant_bypass_default_flag.

| | | Descriptor |
|---|---|---|
| 1 | slice_segment_header( ) { | |
| 2 | ... | |
| 3 | if( !dependent_slice_segment_flag ) { | |
| 4 | for( i = 0; i < num_extra_slice_header_bits; i++ ) | |
| 5 | slice_reserved_flag[ i ] | u(1) |
| 6 | slice_type | ue(v) |
| 7 | if( output_flag_present_flag ) | |
| 8 | pic_output_flag | u(1) |
| 9 | if( separate_colour_plane_flag = = 1 ) | |
| 10 | colour_plane_id | u(2) |
| 11† | transquant_bypass_default_flag | u(1) |
| 12 | ... | |
| 13† | if( sample_adaptive_offset_enabled_flag && !transquant_bypass_default_flag ) { | |
| 14* | slice_sao_luma_flag | u(1) |
| 15 | if( ChromaArrayType != 0 ) | |
| 16* | slice_sao_chroma_flag | u(1) |
| 17 | } | |
| 18 | ... | |
| 19† | if( !transquant_bypass_default_flag ) | |
| 20* | slice_qp_delta | se(v) |
| 21† | if( pps_slice_chroma_qp_offsets_present_flag && !transquant_bypass_default_flag ) { | |
| 22* | slice_cb_qp_offset | se(v) |
| 23* | slice_cr_qp_offset | se(v) |
| 24 | } | |
| 25† | if( chroma_qp_adjustment_enabled_flag && !transquant_bypass_default_flag ) | |
| 26* | slice_chroma_qp_adjustment_enabled_flag | u(1) |
| 27† | if( deblocking_filter_override_enabled_flag && !transquant_bypass_default_flag ) | |
| 28* | deblocking_filter_override_flag | u(1) |
| 29† | if( deblocking_filter_override_flag && !transquant_bypass_default_flag ) { | |
| 30* | slice_deblocking_filter_disabled_flag | u(1) |
| 31 | if( !slice_deblocking_filter_disabled_flag ) { | |
| 32* | slice_beta_offset_div2 | se(v) |
| 33* | slice_tc_offset_div2 | se(v) |
| 34 | } | |
| 35 | } | |
| 36† | if( pps_loop_filter_across_slices_enabled_flag && !transquant_bypass_default_flag && ( slice_sao_luma_flag \|\| slice_sao_chroma_flag \|\| !slice_deblocking_filter_disabled_flag ) ) | |
| 37* | slice_loop_filter_across_slices_enabled_flag | u(1) |
| 38 | } | |
| 39 | ... | |
| 40 | } | |

Figure 12:
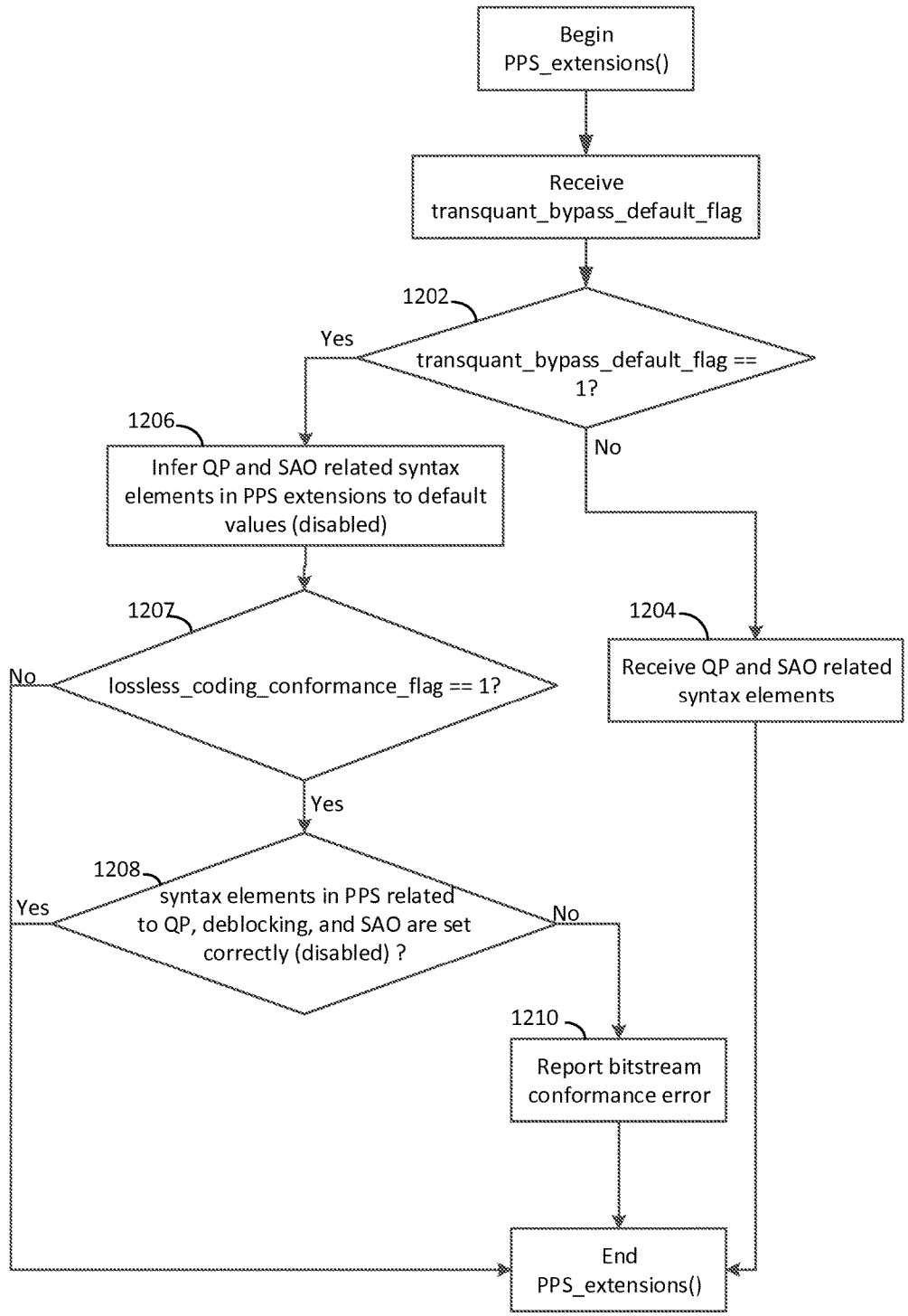
FIG. 12 is a flow chart of a method of decoding a modified PPS extensions syntax using the flag transquant_bypass_default_flag.

Using Table 5 as an example, where the transquant_bypass_default_flag is signaled as part of the PPS extensions, FIG. 12 illustrates one embodiment of an algorithm for parsing the modified PPS extensions syntax at the decoder side. In the modified PPS extensions, the proposed flag transquant_bypass_default_flag is parsed and its value is examined in step 1202. If transquant_bypass_default_flag is equal to 0, then the existing PPS extensions syntax elements in High Efficiency Video Coding (HEVC) Range Extensions text specification (Draft 6) are parsed and processed (step 1204). If transquant_bypass_default_flag is equal to 1, then the syntax elements chroma_qp_adjustment_enabled_flag, log 2_sao_offset_scale_luma, and log 2_sao_offset_scale_chroma are not parsed, and instead their values are inferred to be 0 (step 1206). If the flag lossless_coding_conformance_flag is 1 (step 1207), bitstream conformance requirements are applied. The conformance requirements are applied by checking the signaled values of the existing PPS syntax elements related to quantization, transform, and in-loop filtering (for example, init_qp_minus26, cu_qp_delta_enabled_flag, pps_cb/cr_qp_offset, cu_qp_delta_enabled_flag, pps_loop_filter_across_slices_enabled_flag, deblocking_filter_control_present_flag, loop_filter_across_tiles_enabled_flag, pps_scaling_list_data_present_flag, and so on) to ensure that these syntax elements are properly disabled (step 1208). If one or more of these syntax elements are not disabled, then the decoder will report bitstream conformance violation (step 1210); otherwise, parsing of the PPS extensions is completed normally.

Transform Tree Syntax Signaling

Transform Quadtree Tree Splitting for Lossless Coding.

HEVC and HEVC range extensions use transform tree splitting syntax to signal the size of the transform units (TU). In one embodiment, the transform tree syntax specified in section 7.3.8.8 of High Efficiency Video Coding (HEVC) Range Extensions text specification (Draft 6) does not need to be changed based on the new proposed flag transquant_bypass_default_flag. In another embodiment, the transform tree syntax may be simplified to bypass the quadtree splitting flag (split_transform_flag) and/or signaling of the coded block flags for luma and chroma components (cbf_luma, cbf_cb, cbf_cr) when transquant_bypass_default_flag is equal to 1. The simplified transform_tree( ) syntax is shown in Table 7. The transquant_bypass_default_flag is used as an additional condition for the presence of split_transform_ flag. When not present, the value of split_transform_flag is inferred to be 0 (that is, transform quadtree splitting is not applied) for most cases, and is inferred to be 1 (that is, transform quadtree splitting is applied) for some existing special cases when transform quadtree splitting is enforced (for example, when N×N partition is used in intra coding, or when current CU size is bigger than the largest transform size of 32×32, and so on). Additionally, as shown in Table 7, when transquant_bypass_default_flag is equal to 1, signaling of all cbf flags (for the luma component and the chroma components) in transform_tree( ) may be skipped; instead, their values may be inferred to be equal to 1 because, due to the lack of the quantization process in lossless coding, the cbf flags most likely will have nonzero values.

The semantics of cbf_luma, cbf_cb, and cbf_cr may also be modified. A value of cbf_luma[x0][y0][trafoDepth] equal to 1 may be used to specify that the luma transform block contains one or more transform coefficient levels not equal to 0. The array indices x0, y0 specify the location (x0, y0) of the top-left luma sample of the considered transform block relative to the top-left luma sample of the picture. The array index trafoDepth specifies the current subdivision level of a coding block into blocks for the purpose of transform coding. trafoDepth is equal to 0 for blocks that correspond to coding blocks. When cbf_luma[x0][y0][trafoDepth] is not present, it is inferred to be equal to 1.

A value of cbf_cb[x0][y0][trafoDepth] equal to 1 may be used to indicate that the Cb transform block contains one or more transform coefficient levels not equal to 0. The array indices x0, y0 specify the top-left location (x0, y0) of the considered transform unit. The array index trafoDepth specifies the current subdivision level of a coding block into blocks for the purpose of transform coding. trafoDepth is equal to 0 for blocks that correspond to coding blocks. When cbf_cb[x0][y0][trafoDepth] is not present, the value of cbf_cb[x0][y0][trafoDepth] may be inferred as follows.

If transquant_bypass_default_flag is equal to 1, cbf_cb[x0][y0][trafoDepth] is inferred to be equal to 1

Otherwise, if trafoDepth is greater than 0 and log 2TrafoSize is equal to 2, cbf_cb[x0][y0][trafoDepth] is inferred to be equal to cbf_cb[xBase][yBase][trafoDepth−1]

Otherwise, cbf_cb[x0][y0][trafoDepth] is inferred to be equal to 0.

A value of cbf_cr[x0][y0][trafoDepth] equal to 1 specifies that the Cr transform block contains one or more transform coefficient levels not equal to 0. The array indices x0, y0 specify the top-left location (x0, y0) of the considered transform unit. The array index trafoDepth specifies the current subdivision level of a coding block into blocks for the purpose of transform coding. The value of trafoDepth is equal to 0 for blocks that correspond to coding blocks.

When cbf_cr[x0][y0][trafoDepth] is not present, the value of cbf_cr[x0][y0][trafoDepth] may be inferred as follows:

If transquant_bypass_default_flag is equal to 1, cbf_cr[x0][y0][trafoDepth] is inferred to be equal to 1

Otherwise, if trafoDepth is greater than 0 and log 2TrafoSize is equal to 2, cbf_cr[x0][y0][trafoDepth] is inferred to be equal to cbf_cr[xBase][yBase][trafoDepth−1]

Otherwise, cbf_cr[x0][y0][trafoDepth] is inferred to be equal to 0.

It should be noted that, although Table 7 shows an example of simplifying the transform_tree( ) syntax using the proposed high level flag transquant_bypass_default_flag, the existing block level flag cu_tranquant_bypass_flag may be used instead to condition the presence of split_transform_flag, cbf_luma, cbf_cb, and cbf_cr following the same logic.

TABLE 7

Simplified transform tree syntax.

| | | Descriptor |
|---|---|---|
| 1 | transform_tree( x0, y0, xBase, yBase, log2TrafoSize, trafoDepth, blkIdx ) { | |
| 2† |   if( !transquant_bypass_default_flag && log2TrafoSize <= Log2MaxTrafoSize && | |
| |     log2TrafoSize > Log2MinTrafoSize && | |
| |     trafoDepth < MaxTrafoDepth && !( IntraSplitFlag && ( trafoDepth = = 0 ) ) ) | |
| 3 |     split_transform_flag[ x0 ][ y0 ][ trafoDepth ] | ae(v) |
| 4† |   if(!transquant_bypass_default_flag && log2TrafoSize > 2 && ChromaArrayType != 0 ) { | |
| 5 |     if( trafoDepth = = 0 \| \| cbf_cb[ xBase ][ yBase ][ trafoDepth − 1 ] ) { | |
| 6 |       cbf_cb[ x0 ][ y0 ][ trafoDepth ] | ae(v) |
| 7 |       if( ChromaArrayType = = 2 && ! split_transform_flag[ x0 ][ y0 ][ trafoDepth ] ) | |
| 8 |         cbf_cb[ x0 ][ y0 + ( 1 << ( log2TrafoSize − 1 ) ) ][ trafoDepth ] | |
| 9 |     } | |
| 10 |     if( trafoDepth = = 0 \| \| cbf_cr[ xBase ][ yBase ][ trafoDepth − 1 ] ) { | |
| 11 |       cbf_cr[ x0 ][ y0 ][ trafoDepth ] | ae(v) |
| 12 |       if( ChromaArrayType = = 2 && ! split_transform_flag[ x0 ][ y0 ][ trafoDepth ] ) | |
| 13 |         cbf_cr[ x0 ][ y0 + ( 1 << ( log2TrafoSize − 1 ) ) ][ trafoDepth ] | |
| 14 |     } | |
| 15 |   } | |
| 16 |   if( split_transform_flag[ x0 ][ y0 ][ trafoDepth ] ) { | |
| 17 |     x1 = x0 + ( 1 << ( log2TrafoSize − 1 ) ) | |
| 18 |     y1 = y0 + ( 1 << ( log2TrafoSize − 1 ) ) | |
| 19 |     transform_tree( x0, y0, x0, y0, log2TrafoSize − 1, trafoDepth + 1, 0 ) | |
| 20 |     transform_tree( x1, y0, x0, y0, log2TrafoSize − 1, trafoDepth + 1, 1 ) | |
| 21 |     transform_tree( x0, y1, x0, y0, log2TrafoSize − 1, trafoDepth + 1, 2 ) | |
| 22 |     transform_tree( x1, y1, x0, y0, log2TrafoSize − 1, trafoDepth + 1, 3 ) | |
| 23 |   } else { | |
| 24† |     if( !transquant_bypass_default_flag && (( CuPredMode[ x0 ][ y0 ] = = MODE_INTRA | |
| |       && intra_bc_flag[ x0 ][ y0 ] != 1 ) \| \| trafoDepth != 0 | |
| |       \| \| cbf_cb[ x0 ][ y0 ][ trafoDepth ] \| \| cbf_cr[ x0 ][ y0 ][ trafoDepth ] | |
| |       \| \| ( ChromaArrayType = = 2 | |
| |         && ( cbf_cb[ x0 ][ y0 + ( 1 << ( log2TrafoSize − 1 ) ) ][ trafoDepth ] | |
| |           \| \| cbf_cr[ x0 ][ y0 + ( 1 << ( log2TrafoSize − 1 ) ) ][ trafoDepth ] ) ) ) | |

TABLE 7-continued

Simplified transform tree syntax.

| | Descriptor |
|---|---|
| 25             cbf_luma[ x0 ][ y0 ][ trafoDepth ] | ae(v) |
| 26        transform_unit( x0, y0, xBase, yBase, log2TrafoSize, trafoDepth, blkIdx ) | |
| 27      } | |
| 28  } | |

In an embodiment illustrated in Table 7, for the CUs of different size and coded with different coding modes, the quadtree splitting flag split_transform_flag and the coded block flags cbf_luma, cbf_cb and cbf_cr are bypassed and are inferred to the corresponding default value when the flag transquant_bypass_default_flag is equal to 1. However, depending on the characteristics of the input video, the residuals of the CUs with different block sizes and coding modes could present distinctive statistical characteristics. In this case, it may not be beneficial to disable transform quadtree splitting for all the CUs in one picture or sequence. Instead, in order to improve coding performance, as one embodiment of the disclosure, the proposed transquant_bypass_default_flag is used to bypass the signaling of the transform quadtree splitting flag and/or the coded block flags conditionally, depending on the block size, the coding mode (that is, inter, intra or IBC) of the CU to be coded, or the combination of block size and coding mode. For example, it may be beneficial, in terms of complexity and performance tradeoff, to only allow transform quadtree splitting if a block is coded using non-intra mode (that is, coded using inter or IBC mode) and the block size is 8×8 or 16×16.

In one embodiment, the following apply when the flag transquant_bypass_default_flag is equal to 1. For all the intra-coded CUs, and all the inter-coded and IBC-coded CUs with block size from 64×64 to 32×32, the split_transform_flag and/or the coded block flags (cbf_luma, cbf_cb and cbf_cr) are not signaled; they will be inferred to the corresponding default value as discussed above. For 8×8 and 16×16 CUs coded with inter mode or IBC mode, further splitting may be allowed. The split_transform_flag and/or the coded block flags (cbf_luma, cbf_cb and cbf_cr) are still signaled to indicate whether the current block is further partitioned into four quadrants and/or whether the coefficients in one TU are all zeros, respectively.

In some embodiments, two syntax elements log 2_intra_max_no_transform_split_coding_block_size_minus3 and log 2_inter_max_no_transform_split_coding_block_size_minus3 are added to the SPS or the PPS to specify the maximum CU size for which transform quadtree splitting is applied for intra and inter/IBC coded CUs, respectively. For example, using the conditions 1) and 2) above, the values of log 2_intra_max_no_transform_split_coding_block_size_minus3 and log 2_inter_max_no_transform_split_coding_blocksize_minus3 are set to log 2(64)−3=3 and log 2(16)−3=1, respectively. Table 8 shows the modified SPS screen content coding extension syntax table with the two proposed syntax elements.

Although Table 8 shows two additional syntax elements, in another embodiment of this disclosure, the value of log 2_intra_max_no_transform_split_coding_block_size_minus3 may not be signaled. Instead, the value may be inferred to be always the same as the allowed maximum CU size which can be derived by adding the minimum CU size (as specified by the syntax element log2_min_luma_coding_block_size_minus3 in SPS), with the difference between the maximum and minimum CU sizes (as specified by the syntax element log 2_diff_max_min_luma_coding_block_size in SPS). In such an embodiment, when a CU is coded in intra mode and lossless coding is applied, transform quadtree splitting is not allowed.

TABLE 1

Sequence parameter set screen content coding syntax.

| | | Descriptor |
|---|---|---|
| 1 | sps_scc_extensions( ) { | |
| 2 |   intra_block_copy_enabled_flag | u(1) |
| 3 |   palette_mode_enabled_flag | u(1) |
| 4 |   if( palette_mode_enabled_flag ) { | |
| 5 |     palette_max_size | ue(v) |
| 6 |     palette_max_predictor_size | ue(v) |
| 7 |   } | |
| 8 |   adaptive_mv_resolution_enabled_flag | u(1) |
| 9 |   intra_boundary_filtering_disabled_flag | u(1) |
| 10† |   log2_intra_max_no_transform_partition_coding_block_size_minus3 | ue(v) |
| 11† |   log2_inter_max_no_transform_partition_coding_block_size_minus3 | ue(v) |
| 12 | } | |

The value of log 2_intra_max_no_transform_partition_coding_block_size_minus3, plus 3, specifies the maximum block size of coding units for which transform quadtree splitting is applied when the coding unit is intra coded and when the cu_transquant_bypass_flag is equal to 1.

The value of log 2_inter_max_no_transform_partition_coding_block_size_minus3, plus 3, specifies the maximum block size of coding units for which transform quadtree splitting is applied when the coding unit is inter coded or intra block copy coded and when the cu_transquant_bypass_flag is equal to 1.

Table 9 shows a modified transform_tree( ) syntax table with the proposed signaling constraint of split_transform_flag, cbf_luma, cbf_cb and cbf_cr conditioned on the block size and coding modes of the current CU. Note that although this exemplary embodiment uses both CU coding mode and CU size to condition whether to allow split_transform_flag and cbf signaling, other modified conditions may be used. For example, either (but not both) of coding mode and block size may be used. Additionally, separate (and different) conditions may be applied to split_transform_flag signaling or cbf signaling.

transform_hierarchy_depth_intra to be properly set to 0 when sequence level lossless coding is applied, the signaling of transform_split_flag may be bypassed without requiring any block level changes. Similarly, the signaling of transform_split_flag may be bypassed without requiring any block level changes by imposing a bitstream constraint that the maximum transform size and the minimum transform

TABLE 2

Modified transform tree syntax.

|  |  | Descriptor |
|---|---|---|
| 1 | transform_tree( x0, y0, xBase, yBase, log2TrafoSize, trafoDepth, blkIdx ) { |  |
| 2† |     if( (!cu_transquant_bypass_flag\| \| ( (CuPredMode[ x0 ][ y0 ] == MODE_INTRA && log2TrafoSize <= log2_intra_max_no_transform_partition_coding_unit_size_minus3+3) \| \| (CuPredMode[ x0 ][ y0 ] != MODE_INTRA && log2TrafoSize <= log2_inter_max_no_transform_partition_coding_unit_size_minus3+3) ) ) && log2TrafoSize <= Log2MaxTrafoSize && log2TrafoSize > Log2MinTrafoSize && trafoDepth < MaxTrafoDepth && !( IntraSplitFlag && ( trafoDepth == 0 ) ) ) |  |
| 3 |         split_transform_flag[ x0 ][ y0 ][ trafoDepth ] | ae(v) |
| 4† |     if((!cu_transquant_bypass_flag \| \| ( (CuPredMode[ x0 ][ y0 ] == MODE_INTRA && log2TrafoSize <= log2_intra_max_no_transform_partition_coding_unit_size_minus3+3) \| \| (CuPredMode[ x0 ][ y0 ] != MODE_INTRA && log2TrafoSize <= log2_inter_max_no_transform_partition_coding_unit_size_minus3+3) ) ) && log2TrafoSize > 2 && ChromaArrayType != 0 ) { |  |
| 5 |         if( trafoDepth == 0 \| \| cbf_cb[ xBase ][ yBase ][ trafoDepth − 1 ] ) { |  |
| 6 |             cbf_cb[ x0 ][ y0 ][ trafoDepth ] | ae(v) |
| 7 |             if( ChromaArrayType == 2 && ! split_transform_flag[ x0 ][ y0 ][ trafoDepth ] ) |  |
| 8 |                 cbf_cb[ x0 ][ y0 + ( 1 << ( log2TrafoSize − 1 ) ) ][ trafoDepth ] |  |
| 9 |         } |  |
| 10 |         if( trafoDepth == 0 \| \| cbf_cr[ xBase ][ yBase ][ trafoDepth − 1 ] ) { |  |
| 11 |             cbf_cr[ x0 ][ y0 ][ trafoDepth ] | ae(v) |
| 12 |             if( ChromaArrayType == 2 && ! split_transform_flag[ x0 ][ y0 ][ trafoDepth ] ) |  |
| 13 |                 cbf_cr[ x0 ][ y0 + ( 1 << ( log2TrafoSize − 1 ) ) ][ trafoDepth ] |  |
| 14 |         } |  |
| 15 |     } |  |
| 16 |     if( split_transform_flag[ x0 ][ y0 ][ trafoDepth ] ) { |  |
| 17 |         x1 = x0 + ( 1 << ( log2TrafoSize − 1 ) ) |  |
| 18 |         y1 = y0 + ( 1 << ( log2TrafoSize − 1 ) ) |  |
| 19 |         transform_tree( x0, y0, x0, y0, log2TrafoSize − 1, trafoDepth + 1, 0 ) |  |
| 20 |         transform_tree( x1, y0, x0, y0, log2TrafoSize − 1, trafoDepth + 1, 1 ) |  |
| 21 |         transform_tree( x0, y1, x0, y0, log2TrafoSize − 1, trafoDepth + 1, 2 ) |  |
| 22 |         transform_tree( x1, y1, x0, y0, log2TrafoSize − 1, trafoDepth + 1, 3 ) |  |
| 23 |     } else { |  |
| 24† |         if((!cu_transquant_bypass_flag \| \| ( (CuPredMode[ x0 ][ y0 ] == MODE_INTRA && log2TrafoSize <= log2_intra_max_no_transform_partition_coding_unit_size_minus3+3) \| \| (CuPredMode[ x0 ][ y0 ] != MODE_INTRA && log2TrafoSize <= log2_inter_max_no_transform_partition_coding_unit_size_minus3+3) ) ) && (( CuPredMode[ x0 ][ y0 ] == MODE_INTRA && intra_bc_flag[ x0 ][ y0 ] != 1 ) \| \| trafoDepth != 0 \| \| cbf_cb[ x0 ][ y0 ][ trafoDepth ] \| \| cbf_cr[ x0 ][ y0 ][ trafoDepth ] \| \| ( ChromaArrayType == 2 && ( cbf_cb[ x0 ][ y0 + ( 1 << ( log2TrafoSize − 1 ) ) ][ trafoDepth ] \| \| cbf_cr[ x0 ][ y0 + ( 1 << ( log2TrafoSize − 1 ) ) ][ trafoDepth ] ) ) )) |  |
| 25 |         cbf_luma[ x0 ][ y0 ][ trafoDepth ] | ae(v) |
| 26 |         transform_unit( x0, y0, xBase, yBase, log2TrafoSize, trafoDepth, blkIdx ) |  |
| 27 |     } |  |
| 28 | } |  |

In another embodiment, in order to skip the signaling of split_transform_flag in the lossless case, the syntax elements max_transform_hierarchy_depth_inter and max_transform_hierarchy_depth_intra in SPS can be set to 0. This method requires no low-level changes to the current transform_tree( ) syntax and bypasses the signaling of transform_skip_flag in the case of sequence level lossless coding. In such an embodiment, split_transform_flag is not signaled and instead is inferred to be a default value, which in most cases is 0, except for the cases when TU quadtree splitting is enforced (for example, N×N partition is used for intra coding, or when CU size is larger than the largest TU size and so on). Thus, by imposing a bitstream constraint that requires max_transform_hierarchy_depth_inter and max_ size must be the same in the case of sequence level lossless coding. This constraint can be achieved by requiring the SPS syntax log 2_diff_max_min_transform_block_size to be set to 0 in the case of sequence level lossless coding. Since max_transform_hierarchy_depth_inter, max_transform_hierarchy_depth_intra, and log 2_diff_max_min_transform_block_size are located in SPS, it may be more preferable to also put transquant_bypass_default_flag in SPS in this case.

In another embodiment of the disclosure, an encoder-only method is proposed for lossless coding without adding the flag transquant_bypass_default_flag. In such an embodiment, conditional terms using the transquant_bypass_default_flag can be omitted from the syntax elements in Table 7 and 9 that are marked with a dagger (†). This embodiment does not require modification of the values of syntax elements max_transform_hierarchy_depth_inter and max_transform_hierarchy_depth_intra in the SPS or the syntax elements in transform_tree( ). In order to reduce encoding complexity, although the flag split_transform_flag is still signaled for the encoder-only method, only the transform quadtree splitting indicated by the default value of split_transform_flag as described in Table 7 or Table 9 is tested for each CU.

In some embodiments, when the flag cu_transquant_bypass_flag is equal to 1 for the current CU, the encoder will only test the rate-distortion (R-D) performance of no transform quadtree partition for most cases, and the R-D performance of one-time transform quadtree partition for some special cases, such as when the N×N PU partition is applied to intra-coded CU or the current CU size is bigger than a threshold. This way, this encoder-only method is consistent with the conditions applied to the flag split_transform_flag in Table 7 in the syntax elements marked with a dagger (†).

In another embodiment, when the flag cu_transfquant_bypass_flag is equal to 1, the encoder will only test the R-D performance of no transform quadtree partition for all the intra-coded CUs and all the inter/IBC-coded CUs with block size from 64×64 to 32×32 when the CUs contain exactly one prediction unit; the encoder will only test the R-D performance of one time transform quadtree partition for all the intra-coded CUs and all the inter/IBC-coded CUs with block size from 64×64 to 32×32 when the CUs contain at least two prediction units; for inter/IBC-coded CUs with block size 16×16 and 8×8, the R-D performances of both no transform quadtree splitting and further transform quadtree splitting are tested by the encoder. Thus, this encoder-only method is consistent with the conditions applied to the flag split_transform_flag as marked with a dagger (†) in Table 9. Additionally, although the flag split_transform_flag is still signaled in bit-stream for the above encoder-only methods, one bit-stream conformance constraint may be applied to require the values of the syntax element split_transform_flag be set to its default values depending on the block size and block coding mode.

In some embodiments, the determination of the default value of the transform quadtree splitting flag is based at least in part on a number of prediction units in the relevant coding unit. In one such embodiment, the determination of the default value includes determining whether the coding unit is intra coded, whether a size of the coding unit is larger than a size threshold, and whether the coding unit contains exactly one prediction unit. In response to a determination that the coding unit is not intra coded, that the coding unit is larger than the size threshold, and that the coding unit contains exactly one prediction unit, the default value of the transform quadtree splitting flag is set to indicate no transform quadtree partition.

In another such embodiment, the determination of the default value of the transform quadtree splitting flag includes determining whether the relevant coding unit is intra coded, whether a size of the coding unit is larger than a size threshold, and whether the first coding unit contains at least two prediction units. In response to a determination that the coding unit is not intra coded, that the coding unit is larger than the size threshold, and that the coding unit contains at least two prediction units, the default value of the transform quadtree splitting flag is set to indicate one time transform quadtree partition.

In a further embodiment, the determination of the default value of the transform quadtree splitting flag includes determining whether the relevant coding unit is intra coded and whether the first coding unit contains exactly one prediction unit. In response to a determination that the coding unit is intra coded and contains exactly one prediction unit, the default value of the transform quadtree splitting flag is set to indicate no transform quadtree partition.

In another embodiment, determining the default value of the transform quadtree splitting flag includes determining whether the relevant coding unit is intra coded and whether the coding unit contains at least two prediction units. In response to a determination that the coding unit is not intra coded and that the coding unit contains at least two prediction units, the default value of the transform quadtree splitting flag is set to indicate one time transform quadtree partition.

A determination of whether a coding unit includes exactly one prediction unit or at least two prediction units may be made by determining the partition mode of the coding unit. For example, a coding unit using a 2N×2N partition mode includes exactly one prediction unit, while a coding unit using, partition modes of 2N×N, N×2N, 2N×nU, 2N×nD, nL×2N, nR×2N or N×N, for example, contains at least two prediction units.

Transform Tree Splitting for Intra Block Copy Mode.

The maximum depth of transform quadtree splitting is closely related to encoding and decoding complexity. To provide a flexible tradeoff between coding efficiency and computational complexity, HEVC and its extensions use syntax elements in the SPS to specify TU sizes and TU splitting depth. The values log 2_min_luma_transform_block_size_minus2 and log 2_diff_max_min_luma_transform_block_size indicate the set of TU sizes used to code the video sequence, and max_transform_hierarchy_depth_inter and max_transform_hierarchy_depth_intra indicate the maximum splitting depth for intra and inter coded CUs, respectively. In certain conditions, transform quadtree splitting may be not applied. For example, if max_transform_hierarchy_depth_intra/inter is set to 0, then transform quadtree splitting is not applied to the current intra/inter coded CU.

In HEVC, its range extension, and the SCC draft, when the transform quadtree splitting is disabled, one implicit TU partition method is applied in both lossy and lossless coding such that the value of split_transform_flag is always inferred to be 1 (that is, transform quadtree splitting is applied) for CUs that are partitioned into multiple prediction units (PU) and coded in inter mode. This is because the different motion vectors of the PUs inside the CU may cause artificial high frequency information and lead to inconsistent residuals across the boundaries between neighboring PUs. In this case, splitting the CU into smaller TUs could provide better coding efficiency than using the TU size as large as that of the CU.

In a working draft of the HEVC screen content coding extension (Joshi 2014), the above implicit TU partition is not applied to CUs coded in the IBC mode. More specifically, when transform quadtree splitting is disabled, the value of split_transform_flag is always inferred to be 0 (that is, the transform unit size is set to be the same as that of the CU) for all the IBC-coded CUs. Given the intrinsic similarity between IBC mode and inter mode, the residuals of IBC-coded CUs may present similar characteristics as that of inter-coded CUs. Therefore, it may be also beneficial to apply the implicit TU partition (that is to infer the value of split_transform_flag to be 1) to IBC-coded CUs in order to further improve the efficiency of transform coding. In an embodiment described herein, when transform quadtree partition is disabled, the same implicit TU partition method that is applied to inter mode is also used for IBC coded CUs in both lossy coding and lossless coding. In other words, the value of split_transform_flag is inferred to be 1 (that is, the transform quadtree is split) when more than one PU partitions (for example, 2N×N, N×2N and N×N) exist in the current CU coded with IBC mode.

The derivation process of the value of split_transform_flag is specified in Section 7.4.9.9 of (Joshi 2014). With the enabling of the implicit TU partition for IBC mode in exemplary embodiments disclosed herein, the semantics of split_transform_flag operates as follows.

The array split_transform_flag[x0][y0][trafoDepth] specifies whether a block is split into four blocks with half horizontal and half vertical size for the purpose of transform coding. The array indices x0, y0 specify the location (x0, y0) of the top-left luma sample of the considered block relative to the top-left luma sample of the picture. The array index trafoDepth specifies the current subdivision level of a coding block into blocks for the purpose of transform coding. The value of trafoDepth is equal to 0 for blocks that correspond to coding blocks.

The variable interSplitFlag is derived as follows. InterSplitFlag is set equal to 1 if one or more of the following conditions applies: max_transform_hierarchy_depth_inter is equal to 0 and CuPredMode[x0][y0] is equal to MODE_INTER; or intra_bc_flag[x0][y0] is equal to 1 and PartMode is not equal to PART_2N×2N and trafoDepth is equal to 0. Otherwise, interSplitFlag is set equal to 0.

When split_transform_flag[x0][y0][trafoDepth] is not present, its value is inferred as follows. If one or more of the following conditions are true, the value of split_transform_flag[x0][y0][trafoDepth] is inferred to be equal to 1: log 2TrafoSize is greater than MaxTb Log 2SizeY; IntraSplitFlag is equal to 1 and trafoDepth is equal to 0; or interSplitFlag is equal to 1. Otherwise, the value of split_transform_flag[x0][y0][trafoDepth] is inferred to be equal to 0.

Embodiments

In an exemplary embodiment, a method is provided of coding a video slice including a slice segment header and a plurality of coding units. The method includes generating a bypass flag in the slice segment header indicating whether all of the coding units in the slice are coded with lossless coding.

In some such embodiments, the bypass flag is a transquant_bypass_default_flag. The method may include generating a picture parameter set (PPS) including a transquant_bypass_enabled_flag, wherein the slice refers to the picture parameter set, and wherein the transquant_bypass_enabled_flag is set to zero when the transquant_bypass_default_flag is set to one.

In some embodiments, the bypass flag indicates that not all of the coding units in the slice are coded with lossless coding, and the method further includes generating, in the slice segment header, syntax elements related to lossy coding. The bypass flag may be positioned in front of the syntax elements related to lossy coding.

In some embodiments, wherein the bypass flag indicates that not all of the coding units in the slice are coded with lossless coding, the method further includes generating, in the slice segment header, syntax elements related to the quantization, transformation, and in-loop filtering processes. The bypass flag may be positioned in front of the syntax elements related to the quantization, transformation, and in-loop filtering processes.

In some embodiments, wherein the bypass flag indicates that not all of the coding units in the slice are coded with lossless coding, the method further includes generating, in the slice segment header, one or more syntax elements selected from the group consisting of slice_sao_luma_flag, slice_sao_chroma_flag, slice_qp_delta, slice_cb_qp_offset, slice_cr_qp_offset, slice_chroma_qp_adjustment_enabled_flag, deblocking_filter_override_flag, slice_deblocking_filter_disabled_flag, slice_beta_offset_div2, slice_tc_offset_div2 and slice_loop_filter_across_slices_enabled_flag. The bypass flag may be positioned in front of one or more syntax elements selected from the group consisting of slice_sao_luma_flag, slice_sao_chroma_flag, slice_qp_delta, slice_cb_qp_offset, slice_cr_qp_offset, slice_chroma_qp_adjustment_enabled_flag, deblocking_filter_override_flag, slice_deblocking_filter_disabled_flag, slice_beta_offset_div2, slice_tc_offset_div2 and slice_loop_filter_across_slices_enabled_flag.

In some embodiments, the bypass flag indicates that all of the coding units in the slice are coded with lossless coding, and the method further includes excluding, from the slice segment header, syntax elements related to lossy coding.

In some embodiments, where the bypass flag indicates that all of the coding units in the slice are coded with lossless coding, the method further involves excluding, from the slice segment header, syntax elements related to the quantization, transformation, and in-loop filtering processes.

In some embodiments, where the bypass flag indicates that all of the coding units in the slice are coded with lossless coding, the method further involves excluding, from the slice segment header, one or more syntax elements selected from the group consisting of slice_sao_luma_flag, slice_sao_chroma_flag, slice_qp_delta, slice_cb_qp_offset, slice_cr_qp_offset, slice_chroma_qp_adjustment_enabled_ flag, deblocking_filter_override_flag, slice_deblocking_filter_disabled_flag, slice_beta_offset_div2, slice_tc_offset_ div2 and slice_loop_filter_across_slices_enabled_flag.

In some embodiments, where the bypass flag indicates that not all of the coding units in the slice are coded with lossless coding, the method further includes signaling a cu_transquant_bypass_flag for each coding unit in the slice.

In some embodiments where the bypass flag indicates that all of the coding units in the slice are coded with lossless coding, the method further involves excluding the cu_transquant_bypass_flag from each coding unit in the slice.

In an exemplary embodiment, a method is provided of coding a video including a picture parameter set and at least one slice referring to the picture parameter set (PPS), where the slice includes a slice segment header and a plurality of coding units. In this embodiment, the method includes generating a bypass flag in the picture parameter set indicating whether all of the coding units in the slice that refers to the picture parameter set are coded with lossless coding.

In some such embodiments, the bypass flag is be a transquant_bypass_default_flag. The picture parameter set (PPS) includes a transquant_bypass_enabled_flag, and the transquant_bypass_enabled_flag is set to zero when the transquant_bypass_default_flag is set to one.

In some embodiments where the bypass flag indicates that not all of the coding units in the slice are coded with lossless coding, the method further includes generating, in the slice segment header, syntax elements related to lossy coding.

In some embodiments, where the bypass flag indicates that not all of the coding units in the slice are coded with lossless coding, the method further includes generating, in the slice segment header, syntax elements related to the quantization, transformation, and in-loop filtering processes.

In some embodiments, where the bypass flag indicates that not all of the coding units in the slice are coded with lossless coding, the method further includes generating, in the slice segment header, one or more syntax elements selected from the group consisting of slice_sao_luma_flag, slice_sao_chroma_flag, slice_qp_delta, slice_cb_qp_offset, slice_cr_qp_offset, slice_chroma_qp_adjustment_enabled_flag, deblocking_filter_override_flag, slice_deblocking_filter_disabled_flag, slice_beta_offset_div2, slice_tc_offset_div2 and slice_loop_filter_across_slices_enabled_flag.

In some embodiments, where the bypass flag indicates that all of the coding units in the slice are coded with lossless coding, the method further involves excluding, from the slice segment header, syntax elements related to lossy coding.

In some embodiments, where the bypass flag indicates that all of the coding units in the slice are coded with lossless coding, the method further involves excluding, from the slice segment header, syntax elements related to the quantization, transformation, and in-loop filtering processes.

In some embodiments, where the bypass flag indicates that all of the coding units in the slice are coded with lossless coding, the method involves excluding, from the slice segment header, one or more syntax elements selected from the group consisting of slice_sao_luma_flag, slice_sao_chroma_flag, slice_qp_delta, slice_cb_qp_offset, slice_cr_qp_offset, slice_chroma_qp_adjustment_enabled_flag, deblocking_filter_override_flag, slice_deblocking_filter_disabled_flag, slice_beta_offset_div2, slice_tc_offset_div2 and slice_loop_filter_across_slices_enabled_flag.

In some embodiments, where the bypass flag indicates that not all of the coding units in the slice are coded with lossless coding, the method further includes signaling a cu_transquant_bypass_flag for each coding unit in the slice.

In some embodiments, where the bypass flag indicates that all of the coding units in the slice are coded with lossless coding, the method further involves excluding the cu_transquant_bypass_flag from each coding unit in the slice.

In an exemplary embodiment, a method is provided of coding a video, where the video includes a high level syntax structure and at least one slice referring to the high level syntax structure, with the slice including a plurality of coding units. The method includes generating a bypass flag in the high level syntax structure indicating whether all of the coding units in the slice are coded with lossless coding. For each respective coding unit, a determination is made of whether to generate a quadtree splitting flag. The determination is based at least in part on a parameter selected from the group consisting of block size and coding mode of the respective coding unit. A quadtree splitting flag is generated for a respective coding unit only after making a determination to generate the quadtree splitting flag.

In such an embodiment, the high level syntax structure may be a picture parameter set, a segment slice header, or a split_transform_flag. In some such embodiments, the quadtree splitting flag is generated only if a block is coded using non-intra mode and the block size is 8×8 or 16×16. The quadtree splitting flag is not generated if a block size is from 64×64 to 32×32.

Some embodiments further involve generating a high level syntax element indicating a maximum no-transform quadtree split block coding size. In some embodiments, the high level syntax element indicating a maximum no-transform quadtree split block coding size is generated in a sequence parameter set (SPS). In some embodiments, the high level syntax element indicating a maximum no-transform quadtree split block coding size is generated in a picture parameter set (PPS).

In some embodiments, the high level syntax element is used to indicate a maximum no-transform quadtree split block coding size indicates a maximum no-transform quadtree split block coding size for blocks coded in non-intra mode.

In some embodiments, the quadtree splitting flag is generated if a block is coded using non-intra mode and the block size is no greater than the maximum no-transform quadtree split block coding size for blocks coded in non-intra mode.

In some embodiments, the high level syntax element indicating a maximum no-transform quadtree split block coding size indicates a maximum no-transform split block coding size for blocks coded in intra mode.

In some embodiments, the quadtree splitting flag is generated if a block is coded using intra mode and the block size is no greater than the maximum no-transform quadtree split block coding size for blocks coded in intra mode.

In an exemplary embodiment, a method is provided of coding a video, where the video includes a high level syntax structure and at least one slice referring to the high level syntax structure, with the slice including a plurality of coding units. The method includes generating a bypass flag in the high level syntax structure indicating whether all of the coding units in the slice are coded with lossless coding. For each respective coding unit, a determination is made of whether to generate a coded block flag based at least in part on a parameter selected from the group consisting of block size and coding mode of the respective coding unit. A coded block flag is generated for a respective coding unit only after making a determination to generate the coded block flag.

In such an embodiment, the high level syntax structure may be a picture parameter set or a segment slice header. The coded block flag may be one or more of a cbf_luma flag, a cbf_cb flag, or a cbf_cr flag. In some embodiments, the coded block flag is generated only if a block is coded using non-intra mode and the block size is 8×8 or 16×16; whereas the coded block flag is not generated if a block is coded using intra mode or if the block size is from 64×64 to 32×32.

In some embodiments, a high level syntax element is generated indicating a maximum no-transform quadtree split block coding size. The high level syntax element indicating a maximum no-transform quadtree split block coding size may be generated in a sequence parameter set (SPS) or a picture parameter set (PPS).

In some embodiments, the high level syntax element indicates a maximum no-transform quadtree split block coding size indicating a maximum no-transform quadtree split block coding size for blocks coded in non-intra mode. The coded block flag is generated if a block is coded using non-intra mode and the block size is no greater than the maximum no-transform split block coding size for blocks coded in inter mode.

In some embodiments, the high level syntax element that indicates a maximum no-transform split block coding size indicates a maximum no-transform split block coding size for blocks coded in intra mode.

In some embodiments, the coded block flag is generated if a block is coded using intra mode and the block size is no greater than the maximum no-transform split block coding size for blocks coded in intra mode.

In an exemplary embodiment, a method is provided of coding a video, where the video includes a high level syntax structure and at least one slice referring to the high level syntax structure, the slice including a plurality of coding units. The method includes determining that a the flag cu_transquant_bypass_flag is equal to 1 for the coding unit. A determination is made, based on at least one of the coding unit size and coding mode of the coding unit, to test the rate-distortion performance of one-time transform quadtree partition. After the determination, the rate-distortion performance is tested of one-time transform quadtree partition.

In some such embodiments, the method further includes, for additional coding units, making a determination not to test the rate-distortion performance of one-time transform quadtree partition. Testing of the rate-distortion performance is performed only of no transform quadtree partition for the additional coding units.

In an exemplary embodiment, a method is provided of coding a video, where the video includes a transform tree syntax including a split transform flag and further includes a plurality of coding units. The method includes determining, for a respective coding unit, whether the coding unit is coded in intra-block copy mode and whether more than one prediction unit partition exists in the coding unit. In response to a determination that the coding unit is coded in intra-block copy mode and that more than one prediction unit partition exists in the coding unit, the value of the split transform flag is inferred to be 1.

In an exemplary method, a high level syntax structure is generated including a default value for a coding-unit flag indicating that a transform and quantization process is bypassed.

In some such embodiments, the default value, transquant_bypass_default_flag, is set to 1 indicating a default value of cu_transquant_bypass_flag of all coding units in a slice that refer to the high level syntax structure. The high level syntax structure may be at least one of Picture Parameter Set (PPS), Sequence Parameter Set (SPS), Video Parameter Set (VPS), or slice segment header.

In some embodiments, the method includes generating a bit stream including a PPS with transquant_bypass_enabled_ flag equal to 0. In some embodiments, the method includes generating a bit stream wherein coding unit parameters do not include a cu_transquant_bypass_flag.

In an exemplary embodiment, a method is provided of signaling to a decoder via a high level syntax element in a particular high level syntax structure to bypass a transform, transform skip, quantization, and in-loop filtering process for all CUs that refer to the particular high level syntax structure.

In another exemplary embodiment, a method is provided of operating a decoder to receive and process a high level syntax element to identify the presence of a plurality of PPS syntax elements related to any one or more of inverse quantization, inverse transform, and in-loop filtering process.

In some such methods, the high level syntax element is a default flag value (transquant_bypass_default_flag). In some such methods, the high level syntax element is used to identify the presence of a transform_skip_enabled_flag element.

In some embodiments, the method includes determining that the transquant_bypass_enabled_flag is 0 by inference, and responsively eliminating or skipping signaling of cu_transquant_bypass_flag at the CU level. In some embodiments, the default flag is contained in at least one of a PPS extension parameter set, or a SPS extension parameter set.

In some embodiments, the presence of the default flag is conditioned on a value of transquant_bypass_enabled_flag. In some embodiments, the default flag is transquant_bypass_ default_flag.

In some embodiments, the method further includes receiving signaling of an additional conformance flag to indicate that signaled values of syntax elements unused in lossless coding mode are properly set.

In some embodiments, syntax elements including cu_qp_delta_enabled_flag, pps_loop_filter_across_slices_enabled_flag, deblocking_filter_control_present_flag, loop_ filter_across_tiles_enabled_flag, pps_scaling_list_data_present_flag, are set to 0 if the flag transquant_bypass_default_flag is set to 1.

In an exemplary embodiment, a method is provided of receiving a video data bit stream containing a high-level signaling lossless coding syntax element indicating lossless coding is used.

In some such methods, the high-level signaling syntax is one of a picture parameter set (PPS), Sequence Parameter Set (SPS), Video Parameter Set (VPS), or slice segment header. In some such methods, the lossless coding syntax element is used as a condition for presenting one or more SPS syntax elements related to the quantization, transform, transform skip, transform skip rotation, and in-loop filtering processes.

In an exemplary embodiment, a slice segment header is received and a default flag is to condition the identification of slice segment syntax elements used for the transform, quantization, and in-loop filtering processing blocks. In some such methods, the default flag is transquant_bypass_default_flag.

In an exemplary embodiment, a method is performed at a video decoder of receiving a high-level lossless coding indication and responsively shutting down a plurality of processing blocks. In some such embodiments, the high-level lossless coding indication is a parameter element of one of a PPS, SPS, VPS, or slice header. In some embodiments, the plurality of processing blocks includes one or more of any of the following hardware blocks: inverse quantization, inverse transform, deblocking filter, SAO.

A video encoded using any of the foregoing techniques may be transmitted using any appropriate wired or wireless transmission medium and/or may be recorded on any appropriate non-transitory digital storage medium.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method of coding a video slice including a plurality of coding units in a bitstream, the method comprising:
    making a determination to encode at least a first coding unit in the plurality of coding units with lossless coding;
    in response to a determination to encode the first coding unit with lossless coding, determining a default value of a transform quadtree splitting flag of the first coding unit; and
    coding the first coding unit according to the default value of the transform quadtree splitting flag.

2. The method of claim 1, wherein, in response to the determination of the default value of the transform quadtree splitting flag of the first coding unit, the transform quadtree splitting flag of the first coding unit is not signaled in the bitstream.

3. The method of claim 1, wherein the determination of the default value of the transform quadtree splitting flag is based at least in part on whether the first coding unit is intra coded.

4. The method of claim 1, wherein the determination of the default value of the transform quadtree splitting flag is based at least in part on a size of the first coding unit.

5. The method of claim 1, wherein the determination of the default value of the transform quadtree splitting flag is based at least in part on a number of prediction units in the first coding unit.

6. The method of claim 1, wherein determining the default value of the transform quadtree splitting flag includes:
    determining whether the first coding unit is intra coded;
    determining whether a size of the first coding unit is larger than a size threshold; and
    determining whether the first coding unit contains exactly one prediction unit; and
    wherein, in response to a determination that the first coding unit is not intra coded, that the first coding unit is larger than the size threshold, and that the first coding unit contains exactly one prediction unit, the default value of the transform quadtree splitting flag indicates no transform quadtree partition.

7. The method of claim 1, wherein determining the default value of the transform quadtree splitting flag includes:
    determining whether the first coding unit is intra coded;
    determining whether a size of the first coding unit is larger than a size threshold; and
    determining whether the first coding unit contains at least two prediction units; and
    wherein, in response to a determination that the first coding unit is not intra coded, that the first coding unit is larger than the size threshold, and that the first coding unit contains at least two prediction units, the default value of the transform quadtree splitting flag indicates one time transform quadtree partition.

8. The method of claim 1, wherein determining the default value of the transform quadtree splitting flag includes:
    determining whether the first coding unit is intra coded; and
    determining whether the first coding unit contains exactly one prediction unit; and
    wherein, in response to a determination that the first coding unit is intra coded and that the first coding unit contains exactly one prediction unit, the default value of the transform quadtree splitting flag indicates no transform quadtree partition.

9. The method of claim 1, wherein determining the default value of the transform quadtree splitting flag includes:
    determining whether the first coding unit is intra coded; and
    determining whether the first coding unit contains at least two prediction units; and
    wherein, in response to a determination that the first coding unit is not intra coded, and the first coding unit contains at least two prediction units, the default value of the transform quadtree splitting flag indicates one time transform quadtree partition.

10. A method of coding a video in a bitstream, the video including at least one slice having a plurality of coding units, the method comprising, for at least one of the coding units:
    determining whether the coding unit is coded with lossless coding;
    in response to a determination that the coding unit is coded with lossless coding, determining whether a transform quadtree splitting flag for the coding unit is signaled in the bitstream, wherein a transform quadtree splitting flag for the coding unit is determined not to be signaled in the bitstream if the coding unit is intra coded; and
    coding the coding unit using a default value of the transform quadtree splitting flag if the quadtree splitting flag is not signaled in the bitstream and using the signaled transform quadtree splitting flag if the quadtree splitting flag is signaled in the bitstream.

11. The method of claim 10, wherein the transform quadtree splitting flag is further determined not to be signaled in the bitstream if a block size of the coding unit is greater than a threshold size.

12. The method of claim 10, wherein the transform quadtree splitting flag is further determined not to be signaled in the bitstream if a block size of the coding unit is greater than 16×16.

13. The method of claim 10, performed by an encoder, further comprising signaling the quadtree splitting flag in the bitstream in response to a determination that the transform quadtree splitting flag for the coding unit is signaled in the bitstream.

14. The method of claim 10, performed by a decoder, further comprising parsing the transform quadtree splitting flag from the bitstream in response to a determination that the transform quadtree splitting flag for the coding unit is signaled in the bitstream.

* * * * *